US012342364B2

(12) United States Patent
Patil et al.

(10) Patent No.: US 12,342,364 B2
(45) Date of Patent: Jun. 24, 2025

(54) FULL-DUPLEX ACCESS POINTS

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 140 days.

(21) Appl. No.: 16/658,416

(22) Filed: Oct. 21, 2019

(65) Prior Publication Data

US 2020/0154443 A1 May 14, 2020

Related U.S. Application Data

(60) Provisional application No. 62/757,617, filed on Nov. 8, 2018.

(51) Int. Cl.

*H04W 72/541* (2023.01)
*H04L 1/00* (2006.01)
*H04L 5/14* (2006.01)
*H04W 72/30* (2023.01)
*H04W 88/08* (2009.01)

(52) U.S. Cl.

CPC ......... *H04W 72/541* (2023.01); *H04L 1/0015* (2013.01); *H04L 5/143* (2013.01); *H04W 72/30* (2023.01); *H04W 88/08* (2013.01)

(58) Field of Classification Search

CPC . H04W 72/082; H04W 72/005; H04W 88/08; H04W 84/12; H04L 5/143; H04L 1/0015; H04L 1/0003; H04L 1/0009; H04L 1/0026

See application file for complete search history.

(56) References Cited

U.S. PATENT DOCUMENTS

2010/0166010 A1* 7/2010 Ukita ..................... H04L 1/203 370/465
2013/0128875 A1* 5/2013 Kubota ................. H04W 36/08 370/328
2013/0176869 A1* 7/2013 Finlow-Bates ... H04W 52/0254 370/252
2014/0160968 A1* 6/2014 Sahlin .................. H04L 1/0026 370/252

(Continued)

*Primary Examiner* — Chuong M Nguyen

(74) *Attorney, Agent, or Firm* — Kevin M. Donnelly; Holland & Hart LLP

(57) ABSTRACT

This disclosure provides systems, methods and apparatuses for implementing full-duplex communications at an access point (AP) without configuring or modifying associated stations (STAs) to operate as full duplex devices. In some implementations, the AP may select at least one of one or more first STAs to transmit uplink (UL) data to the AP, determine a downlink (DL) signal-to-interference-plus-noise ratio (SINR) for each of one or more second STAs, select at least one of the one or more second STAs to pair with the selected at least one first STA for concurrent DL and UL communications with the AP based at least in part on the determined SINRs, and transmit DL data to the selected at least one second STA concurrently with receiving at least a portion of the UL data from the selected at least one first STA.

28 Claims, 22 Drawing Sheets

100 104 106 106 106 104 104 106 102 104 110 108

130 131 132 STA1 $PL_{0-1}$ UL data to AP AP 102 $PL_{0}$ STA2 DL data to STA2

(56) References Cited

U.S. PATENT DOCUMENTS

| | | | | |
|---|---|---|---|---|
| 2015/0146529 | A1* | 5/2015 | Mayginnes | H04W 16/14<br>370/235 |
| 2015/0327282 | A1* | 11/2015 | Werner | H04W 72/542<br>455/450 |
| 2016/0081031 | A1* | 3/2016 | Barriac | H04W 52/28<br>370/311 |
| 2016/0165607 | A1* | 6/2016 | Hedayat | H04W 24/00<br>370/338 |
| 2016/0344532 | A1* | 11/2016 | Bhat | H04W 72/1263 |
| 2017/0245306 | A1* | 8/2017 | Kim | H04W 92/10 |
| 2018/0020460 | A1* | 1/2018 | Hedayat | H04L 27/2607 |
| 2018/0263045 | A1* | 9/2018 | Zhou | H04W 72/12 |
| 2019/0089515 | A1* | 3/2019 | Madhavan | H04W 52/24 |
| 2019/0342064 | A1* | 11/2019 | Tian | H04L 5/1423 |
| 2020/0314904 | A1* | 10/2020 | Fodor | H04B 7/063 |
| 2020/0322105 | A1* | 10/2020 | Chitrakar | H04L 5/0094 |
| 2021/0281364 | A1* | 9/2021 | Yeh | H04L 1/20 |

* cited by examiner

850
L-STF 851
L-LTF 852
L-SIG 853
RL-SIG 854
HE-SIG-A1/HE-SIG-A2 855
HE-SIG-B 856
HE-STF 857
HE-LTF 858

FULL-DUPLEX ACCESS POINTS

CROSS-REFERENCE TO RELATED APPLICATIONS

This Patent Application claims priority to U.S. Provisional Patent Application No. 62/757,617 entitled "FULL-DUPLEX ACCESS POINTS" filed on Nov. 8, 2018, which is assigned to the assignee hereof. The disclosures of all prior Applications are considered part of and are incorporated by reference in this Patent Application.

TECHNICAL FIELD

This disclosure relates generally to wireless networks, and specifically to full-duplex wireless communications by a wireless access point.

DESCRIPTION OF THE RELATED TECHNOLOGY

A wireless local area network (WLAN) may be formed by one or more access points (APs) that provide a shared wireless medium for use by a number of client devices. Each AP, which may correspond to a Basic Service Set (BSS), periodically broadcasts beacon frames to enable compatible client devices within wireless range of the AP to establish and maintain a communication link with the WLAN. A plurality of APs may be connected together to form an extended Basic Service Set (ESS). WLANs that operate in accordance with the IEEE 802.11 family of standards are commonly referred to as Wi-Fi networks, and client devices that communicate with the AP in a Wi-Fi network may be referred to as wireless stations (STAs). Many APs and STAs are capable of operating on a number of different frequency bands including, for example, the 2.4 GHz frequency band, the 5 GHz frequency band, and the 60 GHz frequency band.

Wi-Fi networks are typically half-duplex networks in which the AP and each of its associated STAs either transmit or receive data at any given time (but do not transmit and receive data at the same time). Although certain to increase performance, implementing a full-duplex wireless network may require new APs and STAs that have full duplex capabilities, which may be expensive.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by an access point (AP), and may include selecting at least one of one or more first stations (STAs) to transmit uplink (UL) data to the AP, determining a downlink (DL) signal-to-interference-plus-noise ratio (SINR) for each of one or more second STAs, selecting at least one of the one or more second STAs to pair with the selected at least one first STA for concurrent DL and UL communications with the AP based at least in part on the determined SINRs, and transmitting DL data to the selected at least one second STA concurrently with receiving at least a portion of the UL data from the selected at least one first STA. In some implementations, selecting the at least one second STA may include determining an UL SINR for each of the one or more first STAs, and selecting the one of the one or more first STAs based at least in part on the determined UL SINRs.

In one or more implementations, the DL data may be transmitted to the selected second STA on a first wireless channel, and the UL data may be received from the selected first STA on a second wireless channel different than the first wireless channel. In some aspects, the first and second wireless channels may be located in different frequency bands (such as the 5 GHz frequency band and the 6 GHz frequency band). In other aspects, the first and second wireless channels may be located in different portions of the same frequency band (such as in a lower portion of the 5 GHz frequency band and in an upper portion of the 5 GHz frequency band). In other implementations, the DL data may be transmitted to the selected second STA on the same channel upon which the UL data is received from the selected first STA.

In some implementations, determining the DL SINR may include requesting the one or more second STAs to measure a first received signal strength indication (RSSI) value of the AP and to measure a second RSSI value of a response frame to be solicited from each of the one or more first STAs, soliciting the response frames from the one or more first STAs, receiving a report containing the measured first and second RSSI values from each of the one or more second STAs, and determining the DL SINR based at least in part on the measured first and second RSSI values.

In other implementations, determining the DL SINR for a respective one of the second STAs may include transmitting a first frame requesting the respective second STA to measure an RSSI value of a second frame to be transmitted from the AP and to measure a RSSI value of a response frame to be solicited from the selected at least one first STA, transmitting the second frame to solicit the response frame from the selected first STA, transmitting a third frame to solicit a report from the respective second STA, receiving a fourth frame comprising the report containing the measured RSSI values from the respective second STA, and determining the DL SINR based at least in part on the measured RSSI values. The first frame may indicate at least one of the one or more first STAs to be monitored by the one or more second STAs, the channel segments, links, frequency bands, or resource units (RUs) to be monitored by the one or more second STAs, an amount of time during which each of the one or more second STAs is to monitor transmissions from the one or more first STAs, or any combination thereof. In one or more implementations, the first and second frames may be transmitted together in a DL multi-user (MU) physical-layer protocol data unit (PPDU), the first frame may include a first physical-layer service data unit (PSDU) transmitted carried on one or more first RUs, and the second frame may include a second PSDU carried on one or more second RUs.

The method may also include transmitting a first communication for soliciting a first response frame from the one or more first STAs and for soliciting a second response frame from the one or more second STAs that includes an RSSI characteristic for each of the first communication and the first response frame, selecting one or more transmission and reception parameters based on the RSSI characteristics, and transmitting the DL data to the selected second STA concurrently with receiving the at least a portion of the UL data from the selected first STA according to the one or more transmission and reception parameters.

Another innovative aspect of the subject matter described in this disclosure can be implemented in a wireless communication device. In some implementations, the wireless communication device may be an access point (AP) that includes at least one modem, at least one processor communicatively coupled with the at least one modem, and at least one memory communicatively coupled with the at least one processor. The memory stores processor-readable code that, when executed by the at least one processor in conjunction with the at least one modem, causes the wireless communication device to perform one or more operations. In some implementations, the one or more operations may include selecting at least one of one or more first STAs to transmit UL data to the wireless communication device, determining a DL SINR for each of one or more second STAs, selecting at least one of the one or more second STAs to pair with the selected at least one first STA for concurrent DL and UL communications with the wireless communication device based at least in part on the determined SINRs, and transmitting DL data to the selected second STA concurrently with receiving at least a portion of the UL data from the selected first STA. In some implementations, selecting the second STA may include determining an UL SINR for each of the one or more first STAs, and selecting the first STA based at least in part on the determined UL SINRs.

In one or more implementations, the DL data may be transmitted to the selected second STA on a first wireless channel, and the UL data may be received from the selected first STA on a second wireless channel different from the first wireless channel. In some aspects, the first and second wireless channels may be located in different frequency bands (such as the 5 GHz frequency band and the 6 GHz frequency band). In other aspects, the first and second wireless channels may be located in different portions of the same frequency band (such as in a lower portion of the 5 GHz frequency band and in an upper portion of the 5 GHz frequency). In other implementations, the DL data may be transmitted to the selected second STA on the same channel upon which the UL data is received from the selected first STA.

In some implementations, determining the DL SINR may include requesting the one or more second STAs to measure a first RSSI value of the wireless communication device and to measure a second RSSI value of a response frame to be solicited from each of the one or more first STAs, soliciting the response frames from the one or more first STAs, receiving a report containing the measured first and second RSSI values from each of the one or more second STAs, and determining the DL SINR based at least in part on the measured first and second RSSI values.

In other implementations, determining the DL SINR for a respective one of the second STAs may include transmitting a first frame requesting the respective second STA to measure a RSSI value of a second frame to be transmitted from the wireless communication device and to measure a RSSI value of a response frame to be solicited from the selected at least one first STA, transmitting the second frame to solicit the response frame from the selected first STA, transmitting a third frame to solicit a report from the respective second STA, receiving a fourth frame including the report containing the measured RSSI values from the respective second STA, and determining the DL SINR based at least in part on the measured RSSI values. The first frame may indicate at least one of the first STAs to be monitored by the one or more second STAs, the channel segments, links, frequency bands, or RUs to be monitored by the one or more second STAs, an amount of time during which each of the one or more second STAs is to monitor transmissions from the one or more first STAs, or any combination thereof. In one or more implementations, the first and second frames may be transmitted together in a DL MU PPDU, the first frame may include a first PSDU carried on one or more first resource units RUs, and the second frame may include a second PSDU carried on one or more second RUs.

Execution of the instructions may also cause the wireless communication device to perform operations including transmitting a first communication for soliciting a first response frame from the one or more first STAs and for soliciting a second response frame from the one or more second STAs that includes an RSSI characteristic for each of the first communication and the first response frame, selecting one or more transmission and reception parameters based on the RSSI characteristics, and transmitting the DL data to the selected second STA concurrently with receiving the at least a portion of the UL data from the selected first STA according to the one or more transmission and reception parameters.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numerals refer to corresponding parts throughout the drawing figures.

DETAILED DESCRIPTION

Figure 1A:
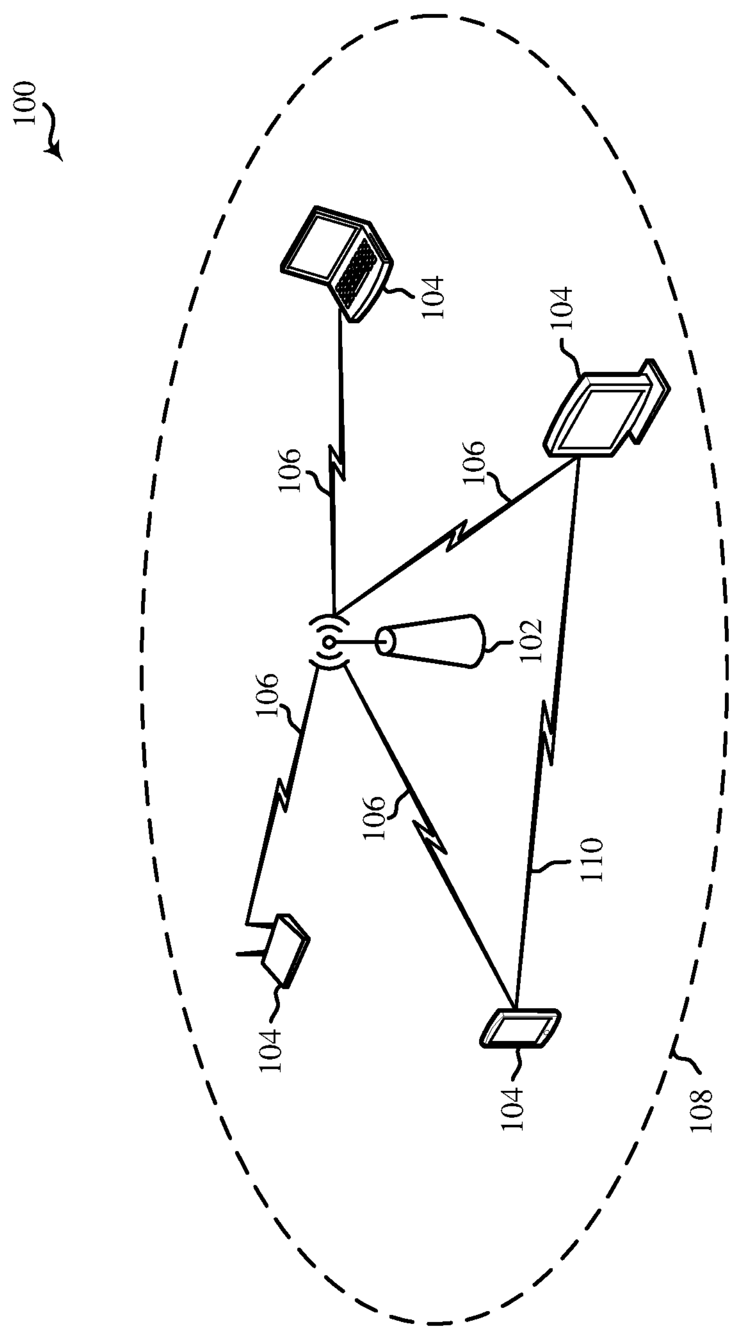
FIG. 1A shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to facilitating concurrent uplink (UL) and downlink (DL) communications by one or more access points (APs) associated with a wireless network. Some implementations more specifically relate to receiving UL data from one or more first wireless devices (such as one or more stations (STAs)) concurrently with transmitting DL data (or at least a portion thereof) to one or more second wireless devices (such as one or more other STAs) while allowing the first and second wireless devices to operate as half-duplex devices. Similarly, some other implementations more specifically relate to transmitting DL data to one or more second wireless devices concurrently with receiving UL data (or at least a portion thereof) from one or more first wireless devices while allowing the first and second wireless devices to operate as half-duplex devices. In some implementations, the AP may re-use portions of the wireless medium initially allocated to one or more first wireless devices for UL transmissions by re-allocating the portions of the wireless medium for DL transmissions to one or more second wireless devices. In some aspects, the AP may duplex portions of the wireless medium occupied by relatively low data-rate UL transmissions, and may transmit relatively high data-rate DL communications to the second stations concurrently with receiving at least a portion of the UL data from the first stations.

In some implementations, the AP may pair each of one or more of the first wireless devices with one or more corresponding second wireless devices in a manner that minimizes interference between UL data transmissions from the first wireless devices and DL data transmissions to the second wireless devices. In some implementations, the AP may select or group pairs of the first and second wireless devices for concurrent UL and DL communications with the AP based on received signal strength indication (RSSI) values measured by one or more of the first wireless devices, RSSI values measured by one or more of the second wireless devices, signal-to-interference-plus-noise ratio (SINR) values determined based on the measured RSSI values, pathlosses of the one or more first wireless devices relative to pathlosses of the one or more second wireless devices, or any other suitable values or parameters.

Particular implementations of the subject matter described in this disclosure can be implemented to realize one or more of the following potential advantages. By allowing an AP to receive UL data from one or more first wireless devices concurrently with transmitting at least a portion of DL data to one or more paired second wireless devices (or to transmit DL data to the one or more second wireless devices concurrently with receiving at least a portion of the UL data from the one or more paired first wireless devices), medium utilization and data throughput of a wireless network associated with the AP may be increased (such as compared with wireless networks formed by half-duplex APs) without configuring or modifying the first wireless devices or the second wireless devices to operate as full duplex devices.

In addition, the ability of an AP to receive UL data from some wireless devices on a first channel concurrently with transmitting DL data to other wireless devices on a second channel (which may be different from the first channel) can allow the AP to communicate with a respective client device using a plurality of different channels or communication links available to a wireless network, which may also increase data throughput of the wireless network. In some implementations, the AP may use multi-link aggregation (MLA) techniques to aggregate multiple channels or sub-channels for one or both of UL and DL transmissions. Further, because the AP may select pairs of wireless devices for concurrent UL and DL communications based on one or more of RSSI values, SINR values, or other indicators of interference between the UL channels and the DL channels, various aspects of the subject matter disclosed herein may be used to reduce cross-interference associated with multi-link aggregation.

As used herein, the term "full-duplex communications" may refer to an AP receiving UL data from one or more first wireless devices on a first wireless channel concurrently with transmitting DL data to one or more second wireless devices on a wireless second channel, where the first and second wireless channels may be the same wireless channel or may be different wireless channels. Specifically, in some implementations, the first and second wireless channels may be the same wireless channel or wireless link (such that the first and second wireless channels span similar frequency ranges). In other implementations, the first and second wireless channels may be located in different frequency bands (such as the first wireless channel located in the 5 GHz frequency band and the second wireless channel located in the 6 GHz frequency band). In some other implementations, the first and second wireless channels may be located in different portions of the same frequency band (such as the first wireless channel located in a lower portion of the 5 GHz frequency band and the second wireless channel located in an upper portion of the 5 GHz frequency band, the first wireless channel located in a lower portion of the 2.4 GHz frequency band and the second wireless channel located in an upper portion of the 2.4 GHz frequency band, and so on). In some implementations, each of the first and second wireless devices may include filtering capabilities sufficient to isolate the first and second wireless channels from each other.

FIG. 1A shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1A additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many B14 within range of the STA or to select among multiple APs 102 that together form an extended service set (ESS) including multiple connected B14. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. For instances in which PPDUs are transmitted over a bonded channel, the preamble fields of the PPDUs may be duplicated and transmitted as duplicates in each of the frequency channels or bands that form the bonded channel. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

The AP 102 may be assigned a unique media access control (MAC) address that is programmed therein by, for example, the manufacturer of the access point. Similarly, each of the STAs 104 may also be assigned a unique MAC address. The AP 102 may also assign an association identification (AID) value to each of the STAs 104, for example, so that the AP 102 may identify the STAs 104 using their assigned AID values. The assigned AID values may also allow each of the STAs 104 to be individually identified and addressed by traffic indication map (TIM) elements (such as broadcast in one or more beacon frames) that indicate a presence of buffered downlink (DL) data in the AP 102. In some implementations, trigger frames broadcast by the AP 102 may use the assigned AID values to allocate resource units (RUs) to one or more identified STAs for the transmission of uplink (UL) data.

Figure 1B:
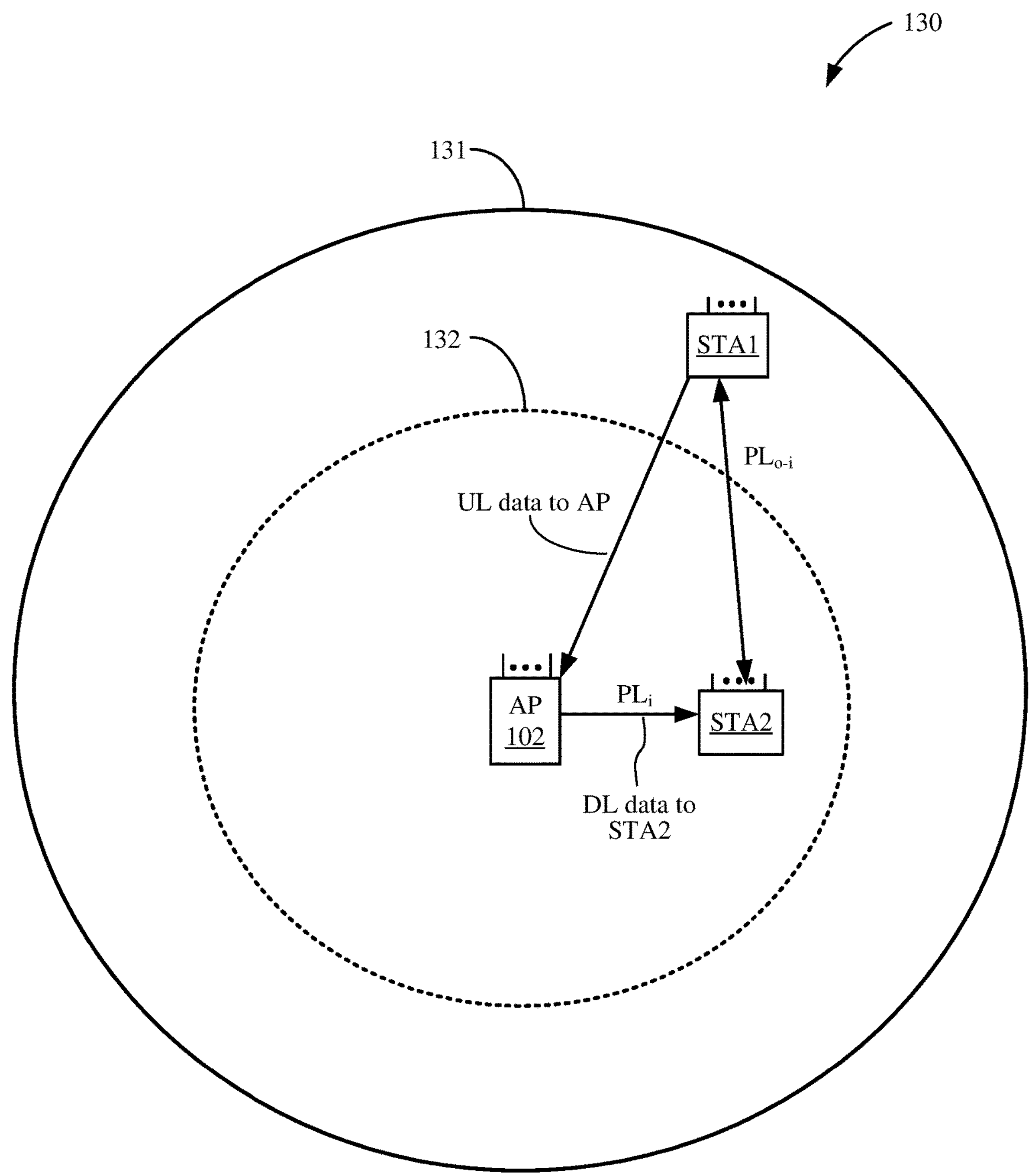
FIG. 1B shows a diagram illustrating pathlosses between a wireless access point (AP) and each of a first station and a second station.

FIG. 1B shows a diagram 130 illustrating pathlosses between the AP 102 and each of a first station (STA1) and a second station (STA2). Although not shown for simplicity, a wireless network (such as the WLAN 120 of FIG. 1A) may include any number of first stations STA1 and may include any number of second stations STA2. In some implementations, UL data transmitted from the first stations STA1 may be considered as a "primary transmission," and DL data transmitted to the second stations STA2 may be considered as a "secondary transmission." In other implementations, DL data transmitted to the second stations STA2 may be considered as the primary transmission, and UL data transmitted from the first stations STA1 may be considered as the secondary transmission.

For purposes of discussion herein, the signal strength of transmissions from the AP received by the first station STA1 is less than the signal strength of transmissions from the AP received by the second station STA2, for example, such that the pathloss ($PL_{o-i}$) of the first station STA1 is greater than the pathloss ($PL_i$) of the second station STA2. The relatively high path loss of the first station STA1 as compared to the relatively low path loss of the second station STA2 is illustrated by STA1 being further away from the AP 102 than STA2 (such that STA1 lies within an inner circle 132 and STA2 lies within an outer circle 131 but not the inner circle 132). In some aspects, the first station STA1 may be referred to as an "outer station," and the second station STA2 may be referred to as an "inner station."

The first station STA1 may have a greater pathloss than the second station STA2 for one or more reasons. These reasons may include (but are not limited to) the first station STA1 having a greater pathloss than the second station STA2, the first station STA1 positioned further from the AP 102 than the second station STA2, the first station STA1 experiencing greater amounts of multipath than the second station STA2, or the first station STA1 having different operating characteristics than the second station STA2.

The AP 102 may group or pair the first station STA1 and the second station STA2 for concurrent UL and DL communications (such as full-duplex communications) with the AP 102. Various aspects of the subject matter described in this disclosure may allow the AP 102 to transmit DL data to the second station STA2 concurrently with receiving at least a portion of the UL data from the first station STA1 (and may allow the AP 102 to receive UL data from the first station STA1 concurrently with transmitting at least a portion of the DL data to the second station STA2). In addition, or in the alternative, the AP 102 may transmit DL data to the first station STA1 concurrently with receiving at least a portion of UL data transmitted from the second station STA2 (and may allow the AP 102 to receive UL data from the second station STA2 concurrently with transmitting at least a portion of the DL data to the first station STA1).

The AP 102 may select the first station STA1 and the second station STA2 for concurrent UL and DL transmissions in any suitable manner that minimizes interference between UL data transmissions from the first station STA1 and DL data transmissions to the second station STA2. In some implementations, the AP 102 may select the first station STA1 and the second station STA2 for concurrent UL and DL transmissions based on one or more of received signal strength indicator (RSSI) values measured by the first station STA1 and the second station STA2, signal-to-interference-plus-noise ratio (SINR) values of the first station STA1 and the second station STA2, pathlosses of the first station STA1 and the second station STA2, or any other suitable values, parameters, or metrics.

In some implementations, the AP may transmit DL data to more than one of the second stations STA2 while receiving at least a portion of the UL data from the selected first station STA1. As one non-limiting example, the AP may determine that two of the second stations STA2 may be paired or grouped with the selected first station STA1 based on the measured RSSI values. For example, the selected first station STA1 may have queued UL data having an example transmit duration of 20 ms, the AP may have queued DL data having an example transmit duration of 8 ms for one of the second stations STA2$_1$, and the AP may have queued DL data having an example transmit duration of 10 ms for the other of the second stations $STA2_2$. In this non-limiting example, the AP may duplex the first of the second stations $STA2_1$ for 8 ms and then duplex the second of the second stations $STA2_2$ for 10 ms concurrently with (or at least overlapping a portion of) the 20 ms UL data transmission from the selected first station STA1.

Figure 2:
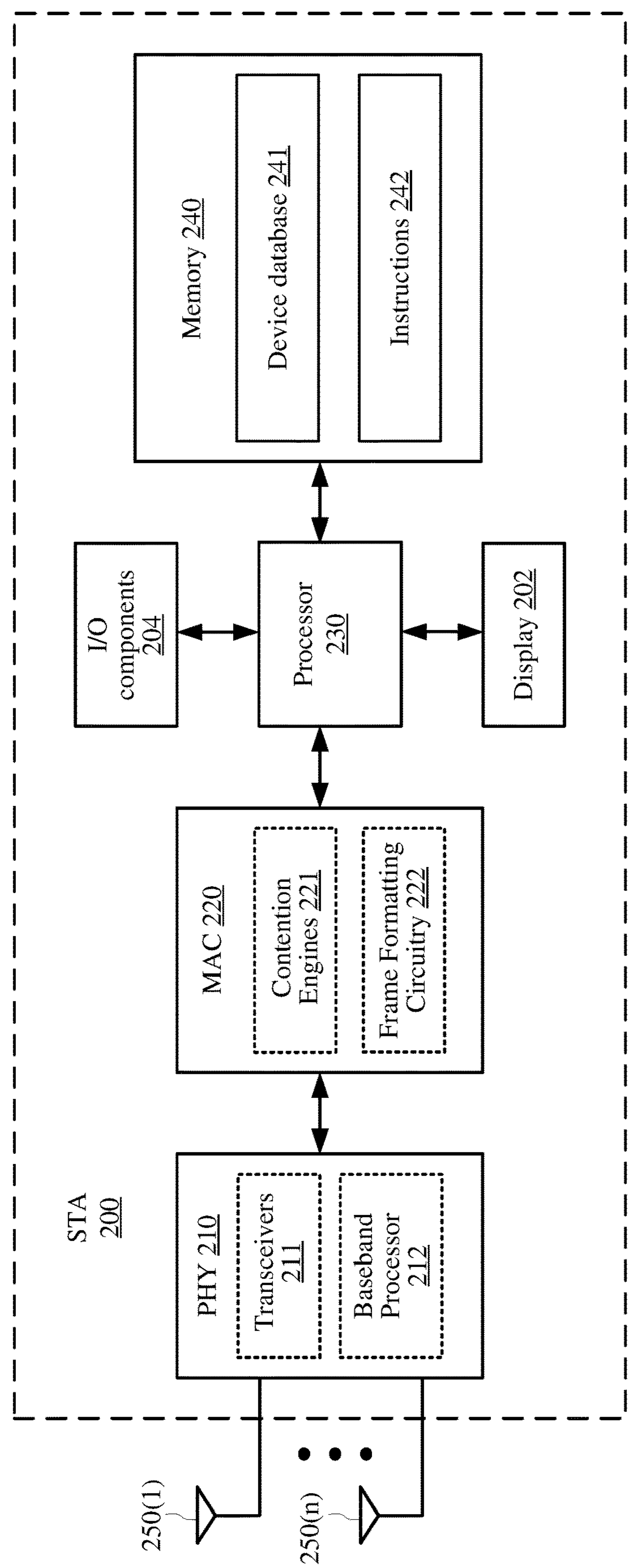
FIG. 2 shows a block diagram of an example wireless station.

FIG. 2 shows an example STA 200. In some implementations, the STA 200 may be one example of the STAs 104 of FIG. 1A, the first station STA1 of FIG. 1B, or the second station STA2 of FIG. 1B. The STA 200 may include a display 202, input/output (I/O) components 204, a physical-layer device (PHY) 210, a MAC 220, a processor 230, a memory 240, and a number of antennas 250(1)-250(*n*).

The display 202 may be any suitable display or screen upon which items may be presented to a user (such as for viewing, reading, or watching). In some aspects, the display 202 may be a touch-sensitive display that allows for user interaction with the STA 200 and that allows the user to control one or more operations of the STA 2000. The I/O components 204 may be or include any suitable mechanism, interface, or device to receive input (such as commands) from the user and to provide output to the user. For example, the I/O components 204 may include (but are not limited to) a graphical user interface, keyboard, mouse, microphone, speakers, and so on.

The PHY 210 may include at least a number of transceivers 211 and a baseband processor 212. The transceivers 211 may be coupled to the antennas 250(1)-250(*n*), either directly or through an antenna selection circuit (not shown for simplicity). The transceivers 211 may be used to transmit signals to and receive signals from the AP 102 and other STAs (see also FIG. 1A), and may be used to scan the surrounding environment to detect and identify nearby access points and other STAs (such as within wireless range of the STA 200). Although not shown in FIG. 2 for simplicity, the transceivers 211 may include any number of transmit chains to process and transmit signals to other wireless devices via the antennas 250(1)-250(*n*), and may include any number of receive chains to process signals received from the antennas 250(1)-250(*n*). In some implementations, the STA 200 may be configured for MIMO operations. The MIMO operations may include SU-MIMO operations and MU-MIMO operations. The STA 200 also may be configured for OFDMA communications and other suitable multiple access mechanisms, for example, as may be provided for in the IEEE 802.11ax standards.

The baseband processor 212 may be used to process signals received from the processor 230 or the memory 240 (or both) and to forward the processed signals to the transceivers 211 for transmission via one or more of the antennas 250(1)-250(*n*), and may be used to process signals received from one or more of the antennas 250(1)-250(*n*) via the transceivers 211 and to forward the processed signals to the processor 230 or the memory 240 (or both).

The MAC 220 may include at least a number of contention engines 221 and frame formatting circuitry 222. The contention engines 221 may contend for access to one more shared wireless mediums, and may also store packets for transmission over the one more shared wireless mediums. The STA 200 may include one or more contention engines 221 for each of a plurality of different access categories. In other implementations, the contention engines 221 may be separate from the MAC 220. For still other implementations, the contention engines 221 may be implemented as one or more software modules (such as stored in memory 240 or stored in memory provided within the MAC 220) containing instructions that, when executed by the processor 230, perform the functions of the contention engines 221.

The frame formatting circuitry 222 may be used to create and format frames received from the processor 230 (such as by adding MAC headers to PDUs provided by the processor 230), and may be used to re-format frames received from the PHY 210 (such as by stripping MAC headers from frames received from the PHY 210). Although the example of FIG. 2 depicts the MAC 220 coupled to the memory 240 via the processor 230, in other implementations, the PHY 210, the MAC 220, the processor 230, and the memory 240 may be connected using one or more buses (not shown for simplicity).

The processor 230 may be any suitable one or more processors capable of executing scripts or instructions of one or more software programs stored in the STA 200 (such as within the memory 240). In some implementations, the processor 230 may be or include one or more microprocessors providing the processor functionality and external memory providing at least a portion of machine-readable media. In other implementations, the processor 230 may be or include an Application Specific Integrated Circuit (ASIC) with the processor, the bus interface, the user interface, and at least a portion of the machine-readable media integrated into a single chip. In some other implementations, the processor 230 may be or include one or more Field Programmable Gate Arrays (FPGAs) or Programmable Logic Devices (PLDs).

The memory 240 may include a device database 241 that stores profile information for the STA 200 and for a number of other wireless devices such as APs and other STAs. The profile information for the STA 200 may include, for example, its MAC address, the BSSID of the basic service set to which the STA 200 belongs, bandwidth capabilities, supported channel access mechanisms, supported data rates, and so on. The profile information for a particular AP may include, for example, the AP's basic service set identification (BSSID), MAC address, channel information, received signal strength indicator (RSSI) values, goodput values, channel state information (CSI), supported data rates, connection history with the AP, a trustworthiness value of the AP (such as indicating a level of confidence about the AP's location, etc.), and any other suitable information pertaining to or describing the operation of the AP.

The memory 240 may also include a non-transitory computer-readable medium (such as one or more nonvolatile memory elements, such as EPROM, EEPROM, Flash memory, a hard drive, and so on) that may store computer-executable instructions 242 to perform all or a portion of one or more operations described in this disclosure.

The processor 230 may be one or more suitable processors capable of executing scripts or instructions of one or more software programs (such as instructions 242) stored within the memory 240. In some implementations, the processor 230 may be one or more general purpose processors that execute the instructions 242 to cause the STA 200 to perform any number of different functions or operations such as, for example, one or more operations of FIGS. 5A-5H, FIGS. 6A-6B, and FIGS. 7A-7D. In additional or alternative aspects, the processor 230 may include integrated circuits or other hardware to perform functions or operations without the use of software. While shown to be coupled to each other via the processor 230 in the example of FIG. 2, the processor 230, the display 202, the I/O components 204, and the MAC 220 may be coupled to one another in various arrangements. For example, the processor 230, the display

202, the I/O components 204, and the MAC 220 may be coupled to each other via one or more local buses (not shown for simplicity).

Figure 3:
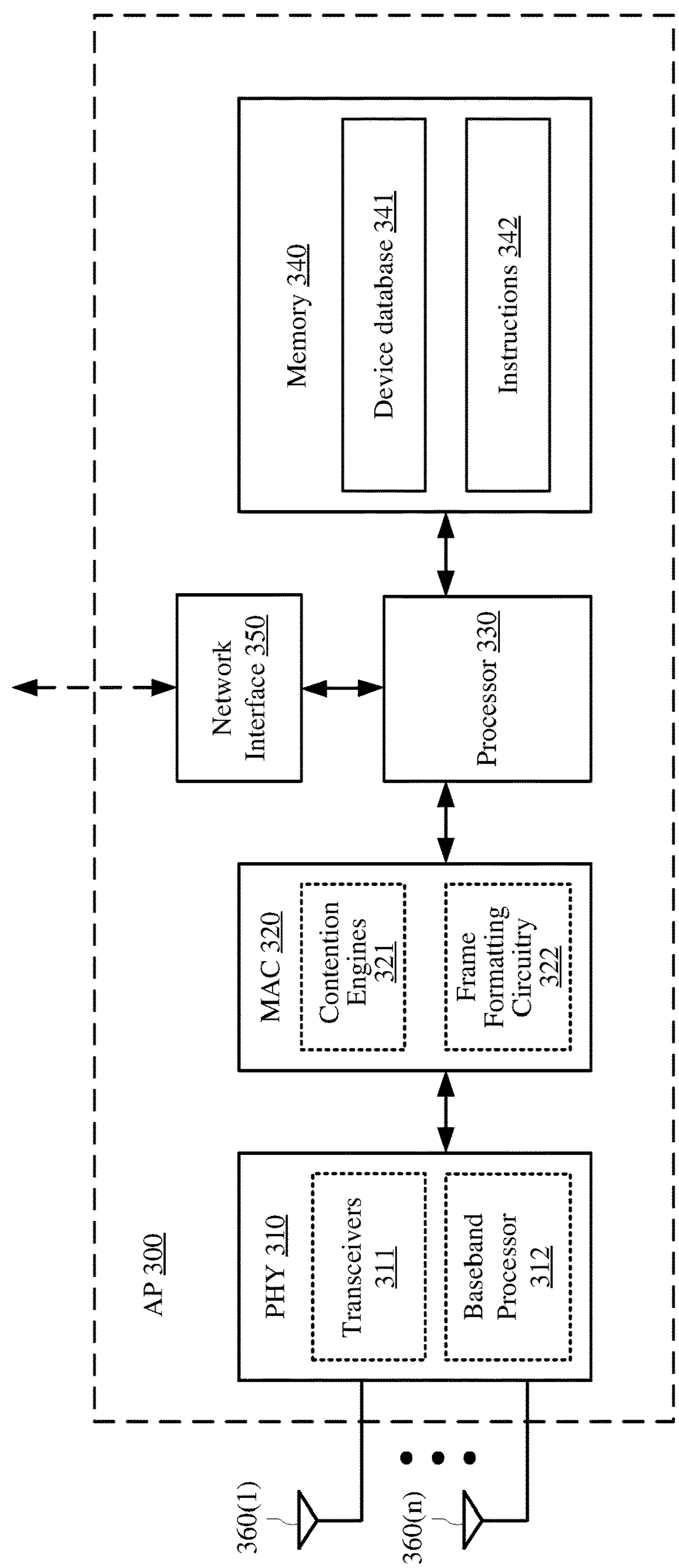
FIG. 3 shows a block diagram of an example wireless access point (AP).

FIG. 3 shows an example AP 300. The AP 300 may be one implementation of the AP 102 of FIGS. 1A-1B. The AP 300 may include a PHY 310, a MAC 320, a processor 330, a memory 340, a network interface 350, and a number of antennas 360(1)-360(*n*). The PHY 310 may include at least a number of transceivers 311 and a baseband processor 312. The transceivers 311 may be coupled to the antennas 360 (1)-360(*n*), either directly or through an antenna selection circuit (not shown for simplicity). The transceivers 311 may be used to communicate wirelessly with one or more STAs, with one or more other APs, and with other suitable devices. Although not shown in FIG. 3 for simplicity, the transceivers 311 may include any number of transmit chains to process and transmit signals to other wireless devices via the antennas 360(1)-360(*n*), and may include any number of receive chains to process signals received from the antennas 360 (1)-360(*n*). In some implementations, the AP 300 may be configured for MIMO operations such as SU-MIMO operations and MU-MIMO operations. The AP 300 also may be configured for OFDMA communications and other suitable multiple access mechanisms, for example, as may be provided for in the IEEE 802.11ax standards.

The baseband processor 312 may be used to process signals received from the processor 330 or the memory 340 (or both) and to forward the processed signals to the transceivers 311 for transmission via one or more of the antennas 360(1)-360(*n*), and may be used to process signals received from one or more of the antennas 360(1)-360(*n*) via the transceivers 311 and to forward the processed signals to the processor 330 or the memory 340 (or both).

The network interface 350 may be used to communicate with a WLAN server (not shown for simplicity) either directly or via one or more intervening networks and to transmit signals.

The MAC 320 may include at least a number of contention engines 321 and frame formatting circuitry 322. The contention engines 321 may contend for access to the shared wireless medium, and may also store packets for transmission over the shared wireless medium. In some implementations, the AP 300 may include one or more contention engines 321 for each of a plurality of different access categories. In other implementations, the contention engines 321 may be separate from the MAC 320. For still other implementations, the contention engines 321 may be implemented as one or more software modules (such as stored in the memory 340 or within memory provided within the MAC 320) containing instructions that, when executed by the processor 330, perform the functions of the contention engines 321.

The frame formatting circuitry 322 may be used to create and format frames received from the processor 330 (such as by adding MAC headers to PDUs provided by the processor 330), and may be used to re-format frames received from the PHY 310 (such as by stripping MAC headers from frames received from the PHY 310). Although the example of FIG. 3 depicts the MAC 320 coupled to the memory 340 via the processor 330, in other implementations, the PHY 310, the MAC 320, the processor 330, and the memory 340 may be connected using one or more buses (not shown for simplicity).

The processor 330 may be any suitable one or more processors capable of executing scripts or instructions of one or more software programs stored in the AP 300 (such as within the memory 340). In some implementations, the processor 330 may be or include one or more microprocessors providing processor functionalities and external memory providing at least a portion of machine-readable media (such as instructions). In other implementations, the processor 330 may be one or more general purpose processors that execute instructions stored in the memory 340 to cause the AP 300 to perform any number of different functions or operations such as, for example, one or more operations of FIGS. 5A-5H, FIGS. 6A-6B, and FIGS. 7A-7D. In additional or alternative aspects, the processor 330 may include integrated circuits or other hardware to perform functions or operations without the use of software. In some implementations, the processor 330 may be or include an Application Specific Integrated Circuit (ASIC) with the processor, the bus interface, the user interface, and at least a portion of the machine-readable media integrated into a single chip. In other implementations, the processor 330 may be or include one or more Field Programmable Gate Arrays (FPGAs) or Programmable Logic Devices (PLDs).

The memory 340 may include a device database 341 that stores profile information for a plurality of STAs. The profile information for a particular STA may include, for example, its MAC address, supported data rates, connection history with the AP 300, one or more RUs allocated to the STA, the BSS with which the STA is associated or to which the STA belongs, and any other suitable information pertaining to or describing the operation of the STA. The device database 341 may also store information indicating which of a number of associated STAs may be selected for full-duplex communications implemented at the AP 300.

The memory 340 may also include a non-transitory computer-readable medium (such as one or more nonvolatile memory elements, such as EPROM, EEPROM, Flash memory, a hard drive, and so on) that may store computer-executable instructions 342 to perform all or a portion of one or more operations described in this disclosure.

The IEEE 802.11ax specification may introduce multiple access mechanisms, such as an orthogonal frequency-division multiple access (OFDMA) mechanism, to allow multiple STAs to transmit and receive data on a shared wireless medium at the same time. For a wireless network using OFDMA, the available frequency spectrum may be divided into a plurality of resource units (RUs) each including a number of different frequency subcarriers, and different RUs may be allocated or assigned (such as by an AP) to different wireless devices (such as STAs) at a given point in time. In this manner, multiple wireless devices may concurrently transmit data on the wireless medium using their assigned RUs or frequency subcarriers.

Figure 4A:
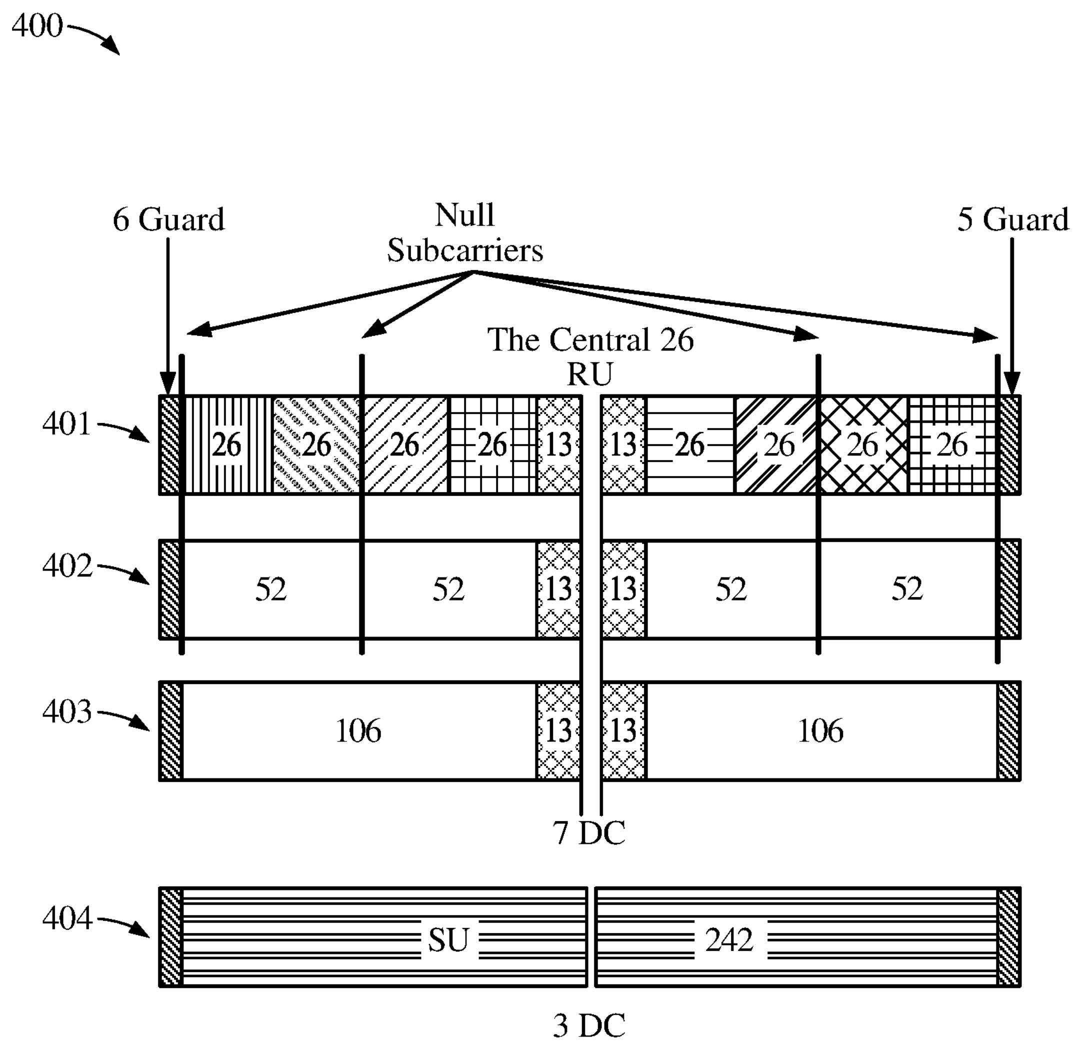
FIGS. 4A-4C show example subcarrier allocation diagrams for a 20 MHz bandwidth, a 40 MHz bandwidth, and an 80 MHz bandwidth, respectively.

FIG. 4A shows an example subcarrier allocation diagram 400 for a 20 MHz bandwidth according to the IEEE 802.11ax standards. The 20 MHz bandwidth may be divided into various numbers of resource units (RUs) each including a multitude of subcarriers. In some implementations, a first subcarrier allocation 401 may include eight RUs each including 26 tones, a second subcarrier allocation 402 may include four RUs each including 52 tones, a third subcarrier allocation 403 may include two RUs each including 106 tones, and a fourth subcarrier allocation 404 may include one RU including 242 tones (with the left half of the channel for single-user (SU) operations). Each 26-tone RU may include 24 data subcarriers and 2 pilot subcarriers, each 52-tone RU may include 48 data subcarriers and 4 pilot subcarriers, each 106-tone RU may include 102 data subcarriers and 4 pilot subcarriers, and the 242-tone RU may include 234 data subcarriers and 8 pilot subcarriers. For each of the example subcarrier allocations 401-404 depicted in FIG. 4A, adjacent RUs may be separated by a null subcarrier (such as a DC subcarrier), for example, to reduce interference between adjacent RUs, to reduce receiver DC offset, and to avoid transmit center frequency leakage.

Figure 4B:
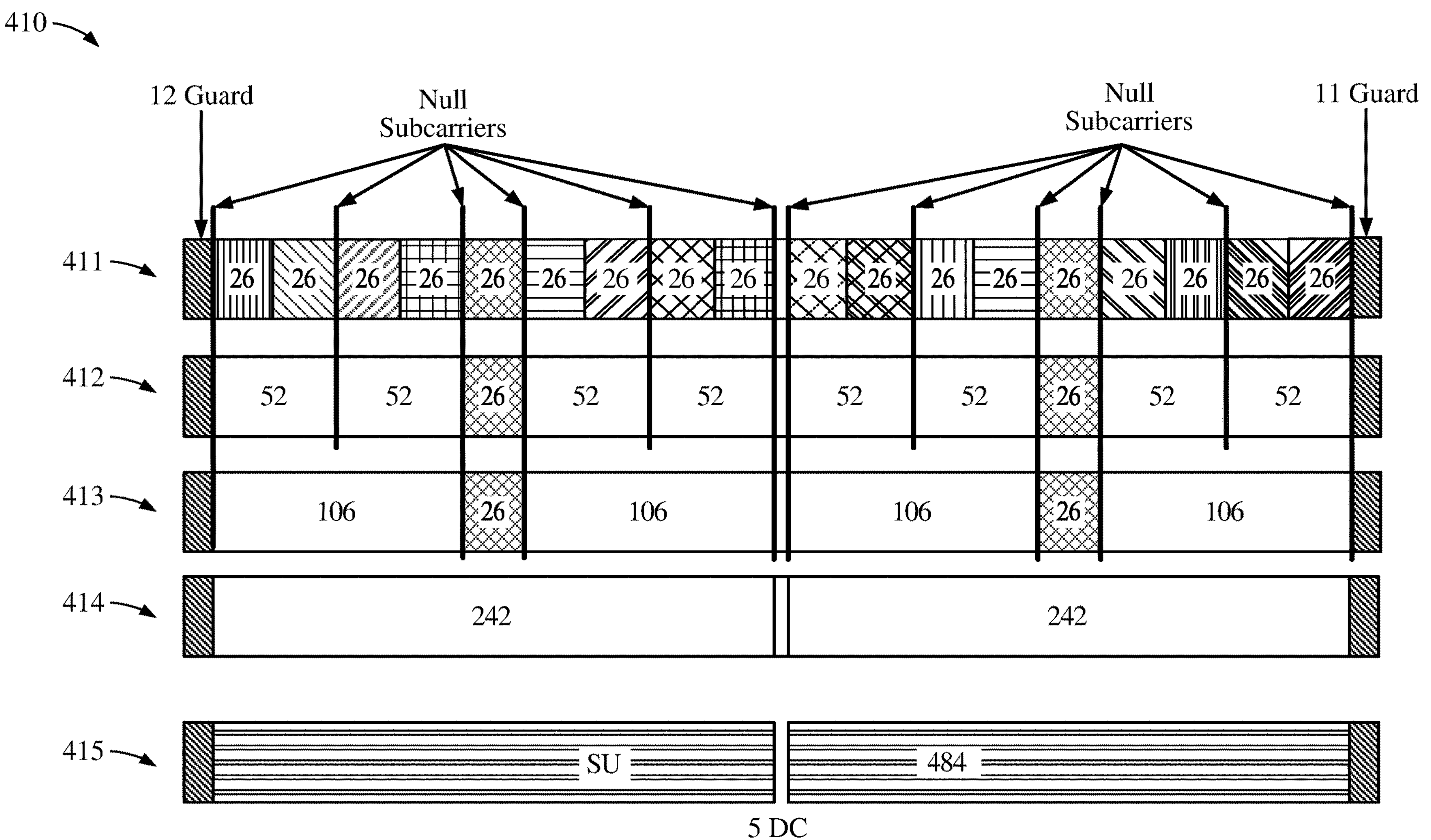

FIG. 4B shows an example subcarrier allocation diagram 410 for a 40 MHz bandwidth according to the IEEE 802.11ax standards. The 40 MHz bandwidth may be divided into various numbers of RUs each including a multitude of subcarriers. In some implementations, a first subcarrier allocation 411 may include eighteen RUs each including 26 tones, a second subcarrier allocation 412 may include eight RUs each including 52 tones, a third subcarrier allocation 413 may include four RUs each including 106 tones, a fourth subcarrier allocation 414 may include two RUs each including 242 tones, and a fifth subcarrier allocation 415 may include one RU including 484 tones (with the left half of the channel for SU operations). Each 26-tone RU may include 24 data subcarriers and 2 pilot subcarriers, each 52-tone RU may include 48 data subcarriers and 4 pilot subcarriers, each 106-tone RU may include 102 data subcarriers and 4 pilot subcarriers, each 242-tone RU may include 234 data subcarriers and 8 pilot subcarriers, and the 484-tone RU may include 468 data subcarriers and 16 pilot subcarriers. For each of the example subcarrier allocations 411-415 depicted in FIG. 4B, adjacent RUs may be separated by a null subcarrier, for example, to reduce interference between adjacent RUs, to reduce receiver DC offset, and to avoid transmit center frequency leakage.

Figure 4C:
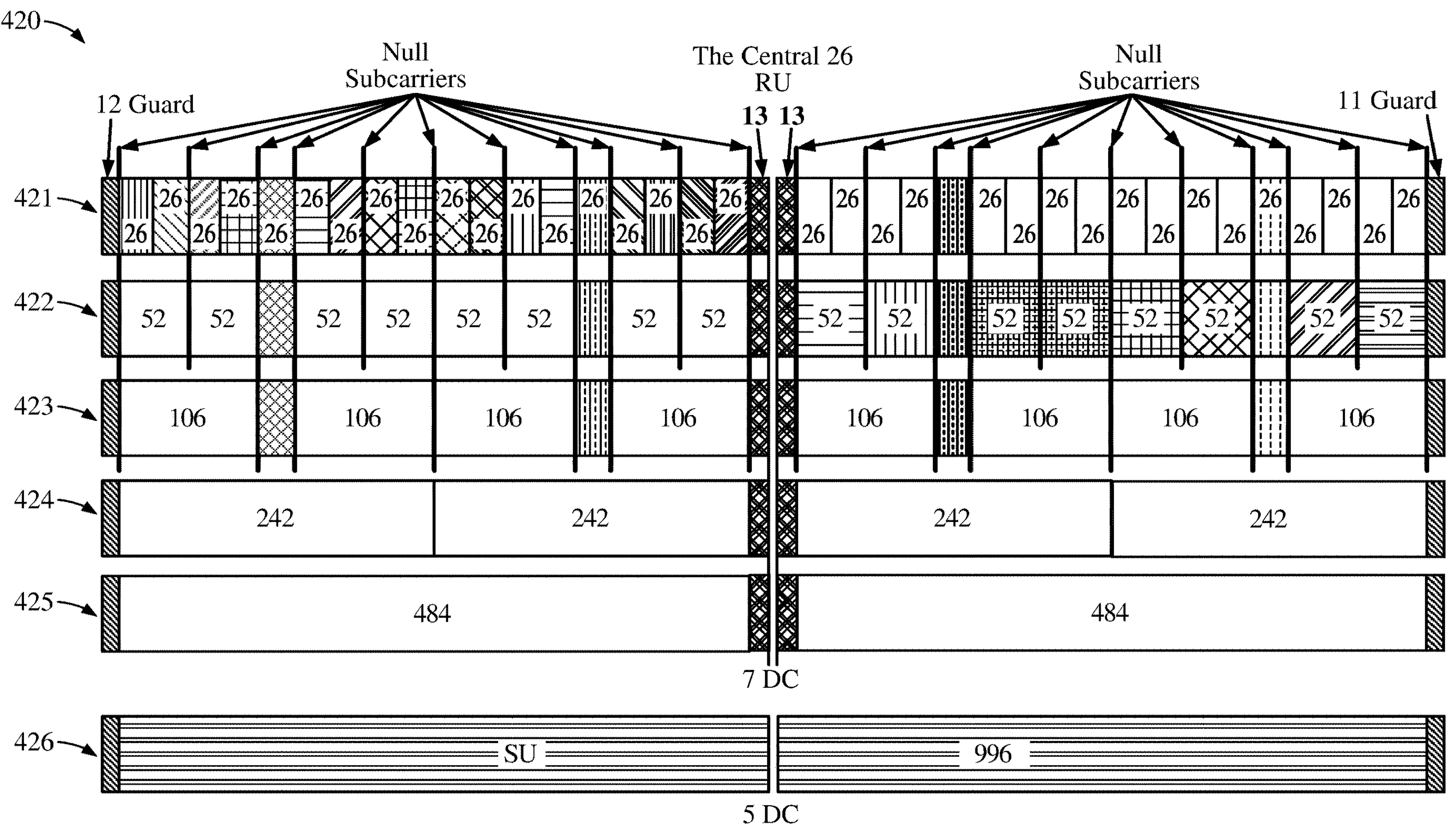

FIG. 4C shows an example subcarrier allocation diagram 420 for an 80 MHz bandwidth according to the IEEE 802.11ax standards. The 80 MHz bandwidth may be divided into various numbers of RUs each including a multitude of subcarriers. In some implementations, a first subcarrier allocation 421 may include thirty-six RUs each including 26 tones, a second subcarrier allocation 422 may include eighteen RUs each including 52 tones, a third subcarrier allocation 423 may include eight RUs each including 106 tones, a fourth subcarrier allocation 424 may include four RUs each including 242 tones, a fifth subcarrier allocation 425 may include two RUs each including 484 tones, and a sixth subcarrier allocation 426 may include one RU including 996 tones (with the left half of the channel for SU operations). Each 26-tone RU may include 24 data subcarriers and 2 pilot subcarriers, each 52-tone RU may include 48 data subcarriers and 4 pilot subcarriers, each 106-tone RU may include 102 data subcarriers and 4 pilot subcarriers, each 242-tone RU may include 234 data subcarriers and 8 pilot subcarriers, each 484-tone RU may include 468 data subcarriers and 16 pilot subcarriers, and the 996-tone RU may include 980 data subcarriers and 16 pilot subcarriers. For each of the example subcarrier allocations 421-426 depicted in FIG. 4C, adjacent RUs may be separated by a null subcarrier, for example, to reduce interference between adjacent RUs, to reduce receiver DC offset, and to avoid transmit center frequency leakage.

An AP may use a trigger frame to allocate specific or dedicated RUs to one or more associated STAs for UL transmissions to the AP. In some implementations, the trigger frame may identify a number of STAs associated with the AP, and may solicit UL MU data transmissions from the identified STAs using their allocated RUs. The trigger frame may use AID values assigned by the AP to identify which STAs are to transmit UL data to the AP upon receiving the trigger frame. In some aspects, the trigger frame may indicate the RU size and location, the modulation and coding scheme (MCS), and the power level for UL transmissions to be used by each of the STAs identified in the trigger frame. As used herein, the RU size may indicate the bandwidth of the RU, and the RU location may indicate which frequency subcarriers are allocated to the RU.

Aspects of the present disclosure may increase medium utilization and data throughput of a wireless network by allowing an AP to receive UL data from one or more first STAs concurrently with transmitting DL data (or at least a portion thereof) to one or more second STAs without configuring or modifying the first or second STAs to implement full-duplex communications. The AP may pair each of one or more of the first STAs with one or more corresponding second STAs in a manner that minimizes interference between UL data transmissions from the first STAs and DL data transmissions to the second STAs. In some implementations, the AP may select or group pairs of the first and second STAs for concurrent UL and DL communications with the AP based on RSSI values measured by one or more of the first STAs, RSSI values measured by one or more of the second STAs, SINR values determined based on the measured RSSI values, pathlosses of the one or more first STAs relative to pathlosses of the one or more second STAs, or any combination thereof.

In some implementations, the AP may instruct each of a selected number of the first STAs to monitor one or more indicated channels, sub-channels, communication links, frequency bands, or RU(s) for data transmissions associated with one or more identified second STAs, and may instruct each of a selected number of the second STAs to monitor one or more indicated channels, sub-channels, communication links, frequency bands, or RU(s) for data transmissions associated with one or more identified first STAs. The selected first STAs may be instructed to measure RSSI values of communication signals transmitted by the identified second STAs on the indicated channels, sub-channels, communication links, frequency bands, or RU(s), and to send a report containing the measured RSSI values to the AP. Similarly, the selected second STAs may be instructed to measure RSSI values of communication signals transmitted by the AP and to measure RSSI values of communication signals transmitted by the identified first STAs on the indicated channels, sub-channels, communication links, frequency bands, or RU(s), and to send a report containing the measured RSSI values to the AP. The AP may use the measured RSSI values provided by the first and second STAs to identify one or more pairs of the first and second STAs for which cross-interference between UL and DL transmissions is relatively small (such as less than a value), and may select one or more of the identified pairs of first and second STAs for concurrent UL and DL communications with the AP.

In addition, the ability of an AP to receive UL data from one or more first STAs concurrently with transmitting at least a portion of DL data to one or more second STAs (or to transmit DL data to one or more second STAs concurrently with receiving at least a portion of UL data from one or more first STAs) as disclosed herein may increase medium utilization and data throughput of a wireless network without the first or second STAs having full-duplex capabilities. Further, the ability of the AP to select one or more pairs of STAs for concurrent UL and DL communications based on corresponding RSSI and SINR values may reduce cross-interference between UL and DL channels implemented using multi-link aggregation (MLA) techniques.

Figure 5A:
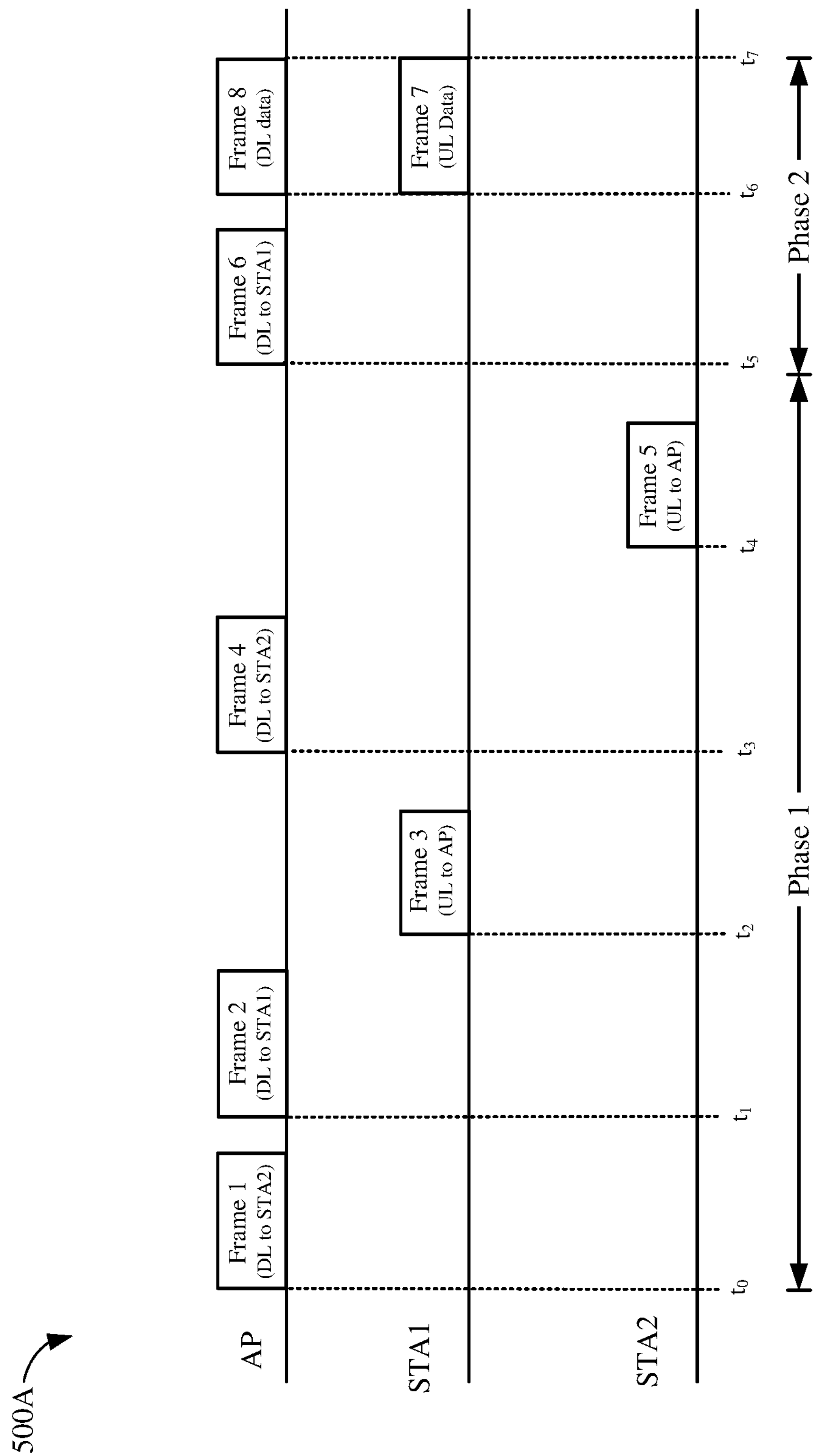
FIGS. 5A-5G show sequence diagrams depicting example operations for wireless communication.

FIG. 5A shows a sequence diagram 500A depicting example operations for wireless communication. The AP of FIG. 5A may be any suitable AP including, for example, the AP 102 of FIGS. 1A-1B or the AP 300 of FIG. 3. Each of the first stations STA1 of FIG. 5A may be any suitable wireless station including, for example, the STAs 104 of FIG. 1A, the first station STA1 of FIG. 1B, or the STA 200 of FIG. 2. Each of the second stations STA2 of FIG. 5A may be any suitable wireless station including, for example, the STAs 104 of FIG. 1A, the second station STA2 of FIG. 1B, or the STA 200 of FIG. 2. For purposes of discussion herein, the first stations STA1 of FIG. 5A may be referred to as outer stations, and the second stations STA2 of FIG. 5A may be referred to as inner stations, for example, based on the first stations STA1 being located further away from the AP than the second station STA2.

The example of FIG. 5A depicts the transmission of eight frames, denoted as Frames 1-8. In some implementations, Frames 1-8 may be separated from each other by a short interframe spacing (SIFS). In other implementations, one or more pairs of Frames 1-8 may be separated from each other by a distributed coordinated function (DCF) short interframe spacing (DIFS). The transmission of Frames 1-5 may be referred to herein as "Phase 1," and the transmission of Frames 6-8 may be referred to herein as "Phase 2." Frames 1-5 transmitted during Phase 1 may correspond to the selection of one or more of the first stations STA1 to be paired with one or more of the second stations STA2 for concurrent UL and DL communications with the AP, and Frames 6-8 transmitted during Phase 2 may correspond to concurrent UL and DL communications with the AP. In some implementations, the AP may consider the UL data transmitted from the first stations STA1 to be a "primary transmission," and may consider the DL data transmitted to the second stations STA2 to be a "secondary transmission." In some other implementations, the AP may consider the DL data transmitted to the second stations STA2 to be the "primary transmission," and may consider the UL data transmitted from the first stations STA1 to be the "secondary transmission."

At time $t_0$, the AP gains access to the wireless medium and transmits Frame 1 to one or more of the second stations STA2. In some implementations, time to may correspond to a beginning of a transmit opportunity (TXOP) or a target wait time (TWT). Frame 1, which may be a trigger frame, a broadcast frame, an action frame, or any other suitable type of frame, may include instructions for one or more of the second stations STA2 to monitor transmissions on the wireless medium. The monitored transmissions may include transmissions from the AP (such as the transmission of Frame 2 at time $t_1$), transmissions from the first stations STA1 (such as the transmission of Frame 3 from STA1 at time $t_2$), or both. In some implementations, Frame 1 may instruct (or request) one or more of the second stations STA2 to measure RSSI values of frames transmitted from the AP, to measure RSSI values of frames transmitted from one or more of the first stations STA1, or both. In some implementations, Frame 1 may identify each of the one or more first stations STA1 whose transmissions are to be monitored (or whose RSSI values are to be measured) by the one or more second stations STA2.

In some implementations, Frame 1 may also indicate the frequency band, channel, sub-channel, or RUs that are to be monitored by the one or more second stations STA2. Frame 1 may also indicate a time period during which the one or more second stations STA2 are to monitor transmissions from the first stations STA1 and the AP. In some aspects, the time period may correspond to a length of a trigger-based (TB) PPDU. In other aspects, the time period may be of a selected duration (such as 5 milliseconds (ms)).

At time $t_1$, the AP transmits Frame 2 to one or more of the first stations STA1. Frame 2, which may be a trigger frame, a broadcast frame, an action frame, or any other suitable type of frame, may solicit (or "trigger") a transmission from one or more of the first stations STA1. In some aspects, Frame 2 may instruct (or request) the one or more first stations STA1 to transmit an UL response frame (such as Frame 3) to the AP.

At time $t_2$, each of the one or more first stations STA1 transmits Frame 3 to the AP based on the instructions or requests contained in Frame 2. Frame 3 may be any suitable response or acknowledgement frame from which one or more of the second stations STA2 can measure RSSI values. In some implementations, a length of Frame 3 may be less than or equal to a length of a PPDU.

In some implementations, each of the one or more second stations STA2 may measure or determine a first RSSI value for Frame 2 transmitted from the AP, and may measure or determine a second RSSI value for Frame 3 transmitted from each of the one or more first stations STA1. The first RSSI values may be indicative of the signal strength of the AP at respective ones of the second stations STA2, and the second RSSI values may be indicative of the signal strength of a corresponding first station STA1 at respective ones of the second stations STA2.

At time $t_3$, the AP transmits Frame 4 to the one or more second stations STA2. Frame 4 may be any suitable type of frame (such as a trigger frame) that solicits UL transmissions from the second stations STA2. In some implementations, Frame 4 may instruct (or request) each of the one or more second stations STA2 to transmit a report (such as an RSSI Report) containing the measured first and second RSSI values.

At time $t_4$, one or more of the second stations STA2 transmits Frame 5 to the AP in response to receiving Frame 4 from the AP. Frame 5 may be any suitable type of frame that can carry RSSI values measured by the one or more second stations STA2. In some implementations, Frame 5 may be a TB PPDU containing an RSSI Report that includes or indicates the first and second RSSI values measured by the one or more second stations STA2.

In some implementations, the AP may calculate one or more SINR values for each of the one or more second stations STA2 based on the measured first and second RSSI values received in the RSSI Report. In other implementations, one or more of the second stations STA2 may calculate the SINR values based on the measured first and second RSSI values, and may include the calculated SINR value(s) in the RSSI Report. In addition, or in the alternative, the RSSI Report may include the calculated SINR values but not the measured first and second RSSI values.

The SINR may be calculated as SINR=R1−R2, where R1 is indicative of the quality of signals received from the AP at the corresponding second station STA2, and R2 is indicative of the quality of signals received from the first station STA1 at the corresponding second station STA2. In some implementations, R1 may be expressed as $R1=TxPower_{AP}-PL_i$, where $TxPower_{AP}$ represents the transmission power of Frame 2 from the AP, and $PL_i$ represents the pathloss from the AP to the corresponding second station STA2. R2 may be expressed as $R2=TxPower_o-PL_{o\rightarrow}$, where $TxPower_o$ represents the transmission power of Frame 3 from the corresponding first station STA1, and $PL_{o\rightarrow i}$ represents the pathloss from the corresponding first station STA1 to the corresponding second station STA2. In some aspects, the SINR of the corresponding second station STA2 may be expressed as the difference between the AP's signal quality and the interference due to signal transmissions from the first station STA1.

The AP may use information determined during Phase 1 to select one or more full duplex communication parameters for concurrent UL and DL transmissions during Phase 2. In some implementations, the AP may select one or more of the first stations STA1 to transmit UL data to the AP and may select one or more of the second stations STA2 to receive DL data from the AP concurrently with the UL data by implementing full-duplex communications at the AP while requiring only half-duplex communications by each of the stations STA1 and STA2. In some implementations, the AP may also calculate or otherwise determine an effective data rate for DL transmissions to each of the selected second stations STA2.

If at least one of the first stations STA1 and at least one of the second stations STA2 are eligible for concurrent UL and DL transmissions during Phase 2, the AP may group the eligible STAs into "pairs" for concurrent UL and DL transmissions to minimize interference between the UL and DL transmissions. In some implementations, the AP may select the members for each pair in a manner that maximizes the SINR (or minimizes the pathloss) between the STAs within each pair. As one non-limiting example, to minimize interference between UL and DL transmissions, the AP may multiplex the multiple pairs of first stations STA1 and second stations STA2 (such as in an OFDM transmission) on different resource units (RUs). The AP may also select or adjust the MCS for transmitting DL data to the second station STA2 based on its determined DL SINR. In some aspects, the DL SINR of the second station STA2 may be a maximum value when the second station STA2 is positioned on or near an imaginary line extending between the AP and the first station STA1, and may decrease as the second station STA2 is moved away from the imaginary line.

At time $t_5$, the AP transmits Frame 6, which may be any suitable frame that solicits or triggers UL data transmissions from the first stations STA1. In some implementations, Frame 6 may include one or more fields decodable by both legacy STAs and high-efficiency (HE) STAs. In some aspects, Frame 6 may include one or more extension fields decodable by high-efficiency (HE) STAs such as, for example, a legacy variant trigger frame with an Extreme High Throughput (EHT) extension. The EHT extension may include an identifier for each of the one or more selected second stations STA2, a listing of corresponding RU allocations, or both.

In some implementations, Frame 6 may also inform the second stations STA2 that the AP is to transmit DL data to the one or more selected second stations STA2 while receiving UL data (or at least a portion thereof) from the one or more selected first stations STA1.

At time $t_6$, the AP may begin transmitting DL data to the one or more selected second stations STA2 while concurrently receiving UL data (at least a portion thereof) from the one or more selected first stations STA1*s*. For example, each of the one or more selected first stations STA1 transmits Frame 7 to the AP concurrently with the transmission of Frame 8 from the AP to the one or more selected second stations STA2. Frame 7 may represent any number of frames or packets containing UL data, and Frame 8 may represent any number of frames or packets containing DL data intended for the one or more selected second stations STA2. The one or more selected first stations STA1 may transmit UL data to the AP using UL MU PPDUs or UL SU PPDUs, and the AP may transmit DL data to the one or more selected second stations STA2 using DL MU PPDUs or DL SU PPDUs.

In some implementations, each of Frame 1, Frame 2, and Frame 4 may be transmitted as individual frames, for example, as depicted in FIG. 5A. In other implementations, one or more of Frame 1, Frame 2, and Frame 4 may be aggregated and transmitted in the same packet or PPDU. For example, Frame 1 and Frame 2 may be transmitted together in a DL MU PPDU or in a single trigger frame, for example, as described with respect to FIGS. 5B and 5C, respectively. In addition, or in the alternative, Frame 4 may be transmitted with Frame 1 and Frame 2 in the DL MU PPDU, for example, as described with respect to FIGS. 5D and 5E.

Figure 5B:
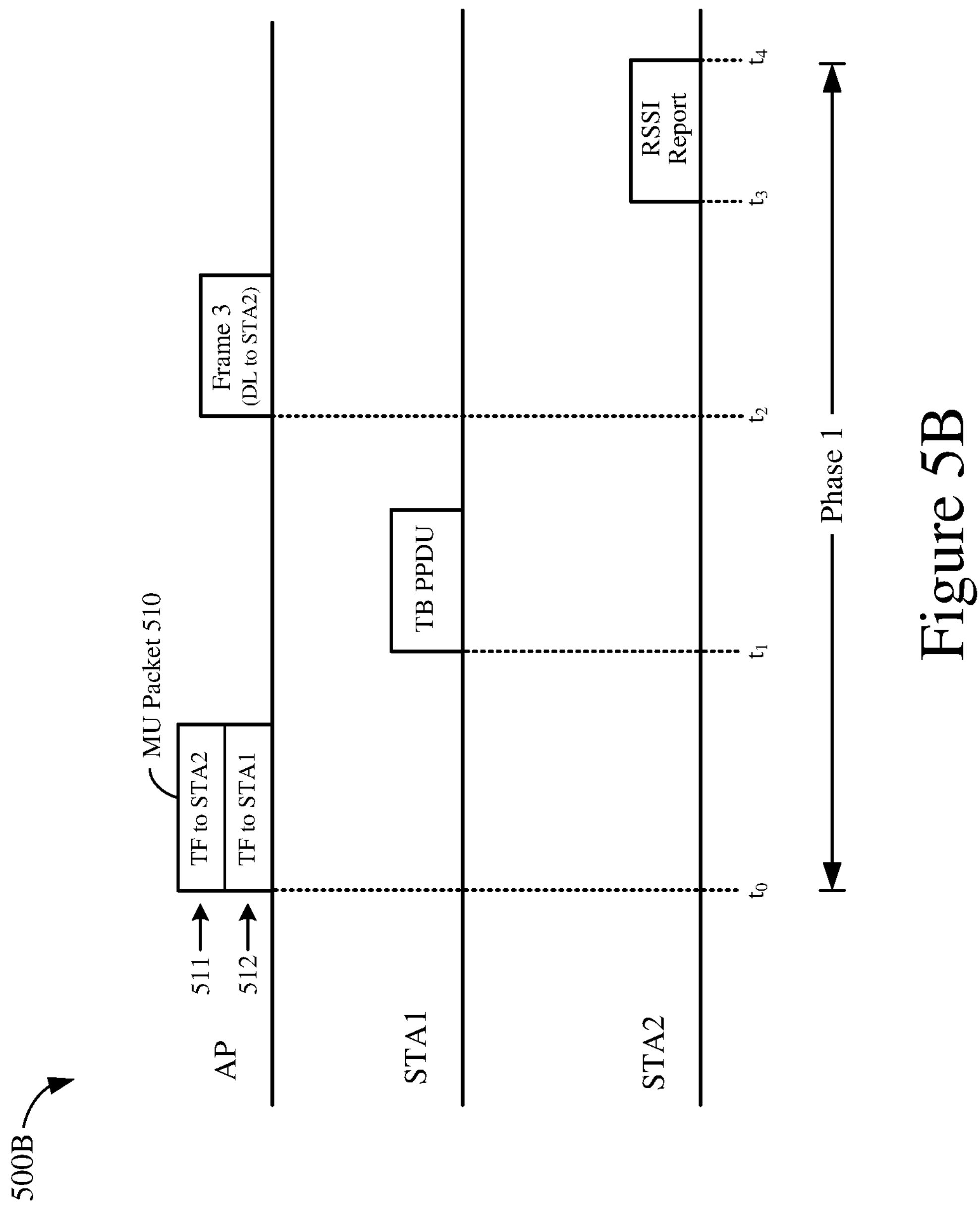

FIG. 5B shows a sequence diagram 500B depicting another example operation for wireless communication. The AP of FIG. 5B may be any suitable AP including, for example, the AP 102 of FIGS. 1A-1B or the AP 300 of FIG. 3. Each of the first stations STA1 of FIG. 5B may be any suitable wireless station including, for example, the STAs 104 of FIG. 1A, the first station STA1 of FIG. 1B, or the STA 200 of FIG. 2. Each of the second stations STA2 of FIG. 5B may be any suitable wireless station including, for example, the STAs 104 of FIG. 1A, the second station STA2 of FIG. 1B, or the STA 200 of FIG. 2. For the example of FIG. 5B, Phase 1 corresponds to the time period between times $t_0$ and $t_4$.

The sequence diagram 500B is similar to Phase 1 of the sequence diagram 500A of FIG. 5A in some aspects, and is different from Phase 1 of the sequence diagram 500A in other aspects. One difference is that rather than transmitting Frame 0 and Frame 1 of FIG. 5A separately, the AP of FIG. 5B may transmit information contained in Frame 0 and Frame 1 as a first frame 511 and a second frame 512, respectively, carried within a MU packet 510. In some implementations, the MU packet 510 may be a DL MU PPDU carrying a plurality of RUs, the first frame 511 may be a first physical-layer service data unit (PSDU) contained in the DL MU PPDU and transmitted using one or more first RUs, and the second frame 512 may be a second PSDU contained in the DL MU PPDU and transmitted using one or more second RUs. In some aspects, the DL MU PPDU may assign one of the plurality of RUs to each of one or more of the first stations STA1 and to each of one or more of the second stations STA2, the first frame 511 may be a trigger frame directed to the one or more second stations STA2, and the second frame 512 may be a trigger frame directed to the one or more first stations STA1.

In some implementations, the MU packet 510 may include a broadcast RU carrying a trigger frame with multiple RUs assigned to different STAs. Each of the receiving STAs may determine whether any of the RUs in the MU packet 510 are addressed to the receiving STA, and if so, may decode the MU packet 510 to determine the RU allocation for the respective STA. In other implementations, the MU packet 510 may include a single broadcast RU, the first frame 511 may be a measurement request frame or a trigger frame, and the second frame 512 may be a buffer status report poll (BSRP) for each of the number of first stations STA1. In some other implementations, the MU packet 510 may include multiple directed RUs, the first frame 511 may include a measurement request frame or a trigger frame for each of the one or more second stations STA2, and the second frame 512 may include a trigger frame for each of the one or more first stations STA1. In some other implementations, the MU packet 510 may include a different frame format, such as a variation on a null data packet announcement (NDPA). In various implementations, one or both of the first frame 511 and the second frame 512 may include a single broadcast RU, multiple directed RUs, a different frame format, or any combination thereof.

Another aspect of the sequence diagram 500B is that the one or more second STAs may begin monitoring transmissions a time interval (such as a short interframe space (SIFS)) after the AP transmits the MU packet 510. In some implementations, the MU packet 510 may indicate the time interval. In other implementations, the MU packet 510 may not indicate the time interval, and the one or more second stations STA2 may be configured to wait the time interval according to one or more IEEE standards.

Figure 5C:
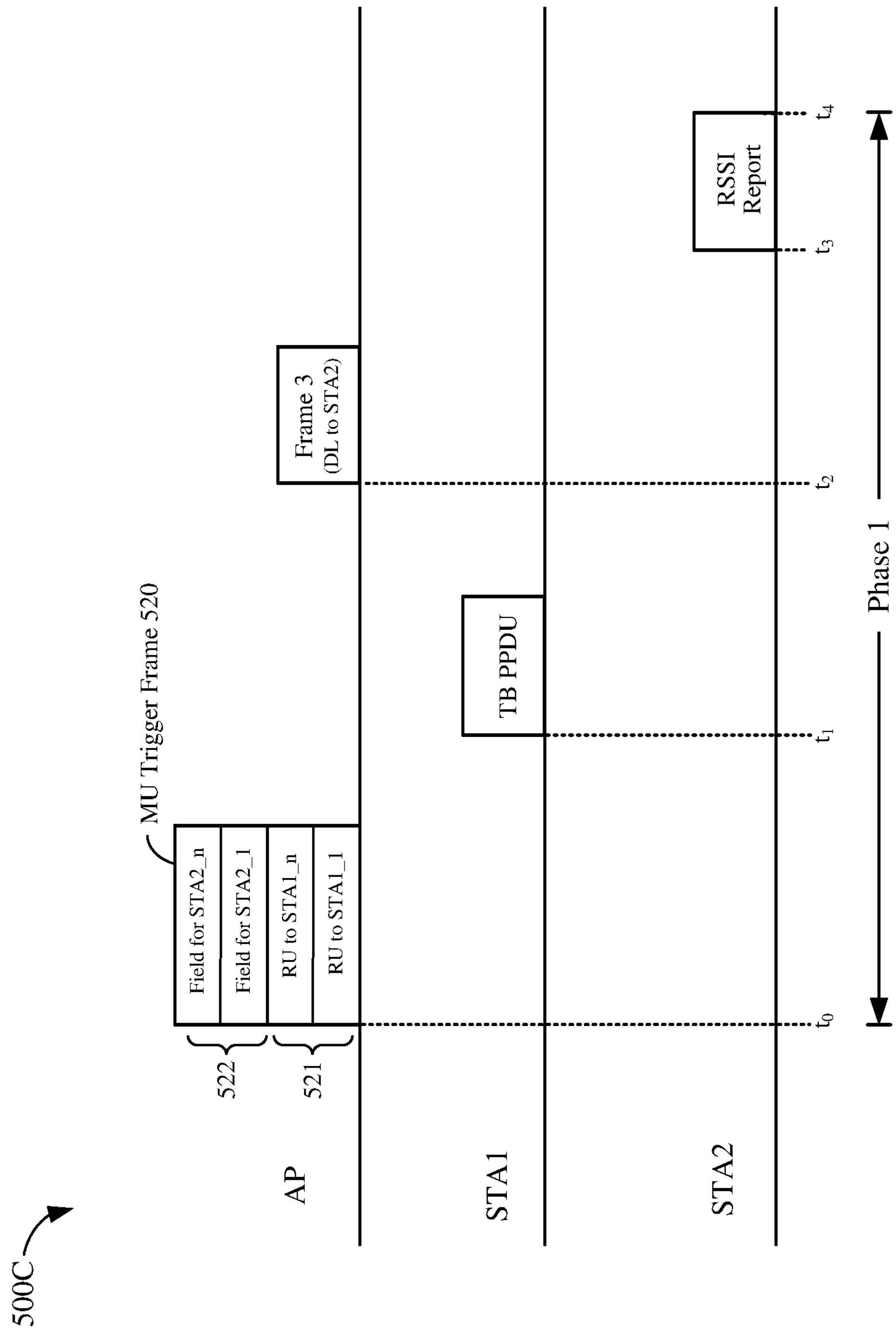

FIG. 5C shows a sequence diagram 500C depicting another example operation for wireless communication. The AP of FIG. 5C may be any suitable AP including, for example, the AP 102 of FIGS. 1A-1B or the AP 300 of FIG. 3. Each of the first stations STA1 of FIG. 5C may be any suitable wireless station including, for example, the STAs 104 of FIG. 1A, the first station STA1 of FIG. 1B, or the STA 200 of FIG. 2. Each of the second stations STA2 of FIG. 5C may be any suitable wireless station including, for example, the STAs 104 of FIG. 1A, the second station STA2 of FIG. 1B, or the STA 200 of FIG. 2. For the example of FIG. 5C, Phase 1 corresponds to the time period between times $t_0$ and $t_4$.

The sequence diagram 500C is similar to Phase 1 of the sequence diagram 500A of FIG. 5A in some aspects, and is different from Phase 1 of the sequence diagram 500A in other aspects. One difference is that rather than transmitting Frame 0 and Frame 1 of FIG. 5A separately, the AP of FIG. 5C may transmit information contained in Frame 0 and Frame 1 as a MU trigger frame 520 including a number of first frames 521 and a number of second frames 522. In some implementations, each of the first frames 521 may assign an RU to a corresponding one of one or more of the first stations STA_1 to STA1_*n*, and each of the second frames 522 may store instructions or requests for a corresponding one of a number of the second stations STA2_1 to STA2_*n*.

Figure 5D:
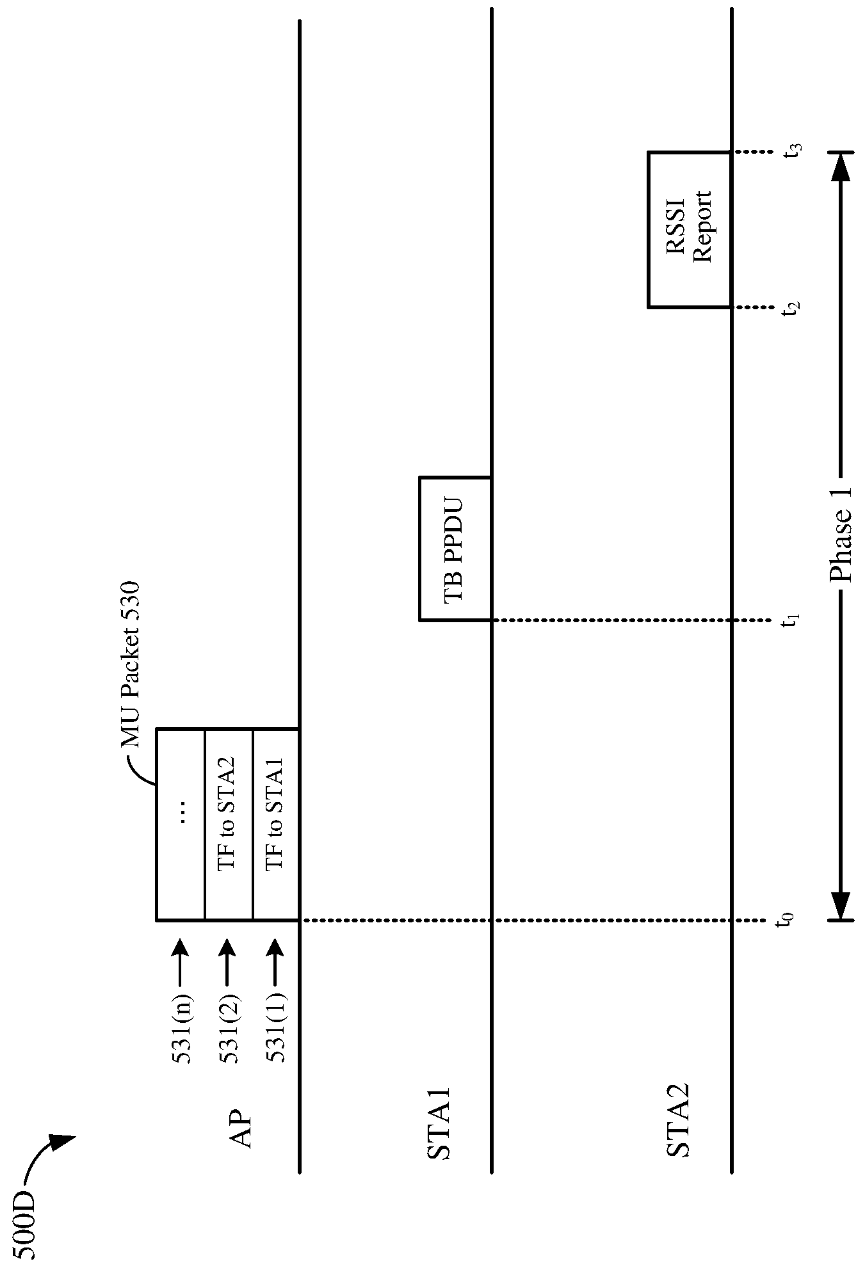

FIG. 5D shows a sequence diagram 500D depicting another example operation for wireless communication. The AP of FIG. 5D may be any suitable AP including, for example, the AP 102 of FIGS. 1A-1B or the AP 300 of FIG. 3. Each of the first stations STA1 of FIG. 5D may be any suitable wireless station including, for example, the STAs 104 of FIG. 1A, the first station STA1 of FIG. 1B, or the STA 200 of FIG. 2. Each of the second stations STA2 of FIG. 5D may be any suitable wireless station including, for example, the STAs 104 of FIG. 1A, the second station STA2 of FIG. 1B, or the STA 200 of FIG. 2. For the example of FIG. 5D, Phase 1 corresponds to the time period between times $t_0$ and $t_3$.

The sequence diagram 500D is similar to Phase 1 of the sequence diagram 500A of FIG. 5A in some aspects, and is different from Phase 1 of the sequence diagram 500A in other aspects. One difference is that rather than transmitting Frame 0, Frame 1, and Frame 4 of FIG. 5A separately, the AP of FIG. 5D may transmit information contained in Frame 0, Frame 1, and Frame 4 as a MU trigger frame 530. In some implementations, the MU trigger frame 530 may be a DL MU PPDU including a plurality of trigger frames 531(1)-531(*n*), and each of the trigger frames 531(1)-531(*n*) may be a PSDU transmitted using one or more associated RUs. For the example of FIG. 5D, the first trigger frame 531(1) may solicit a TB PPDU from each of one or more identified first stations STA1, and the second trigger frame 531(2) may solicit an RSSI report from each of one or more identified second stations STA2. In some implementations, the MU packet 530 may also include instructions for the one or more identified second stations STA2 to transmit the RSSI Report a SIFS after the TB PPDU, at time $t_2$. In some aspects, the one or more identified second stations STA2 may already be configured to transmit the RSSI Report a SIFS after the TB PPDU.

Figure 5E:
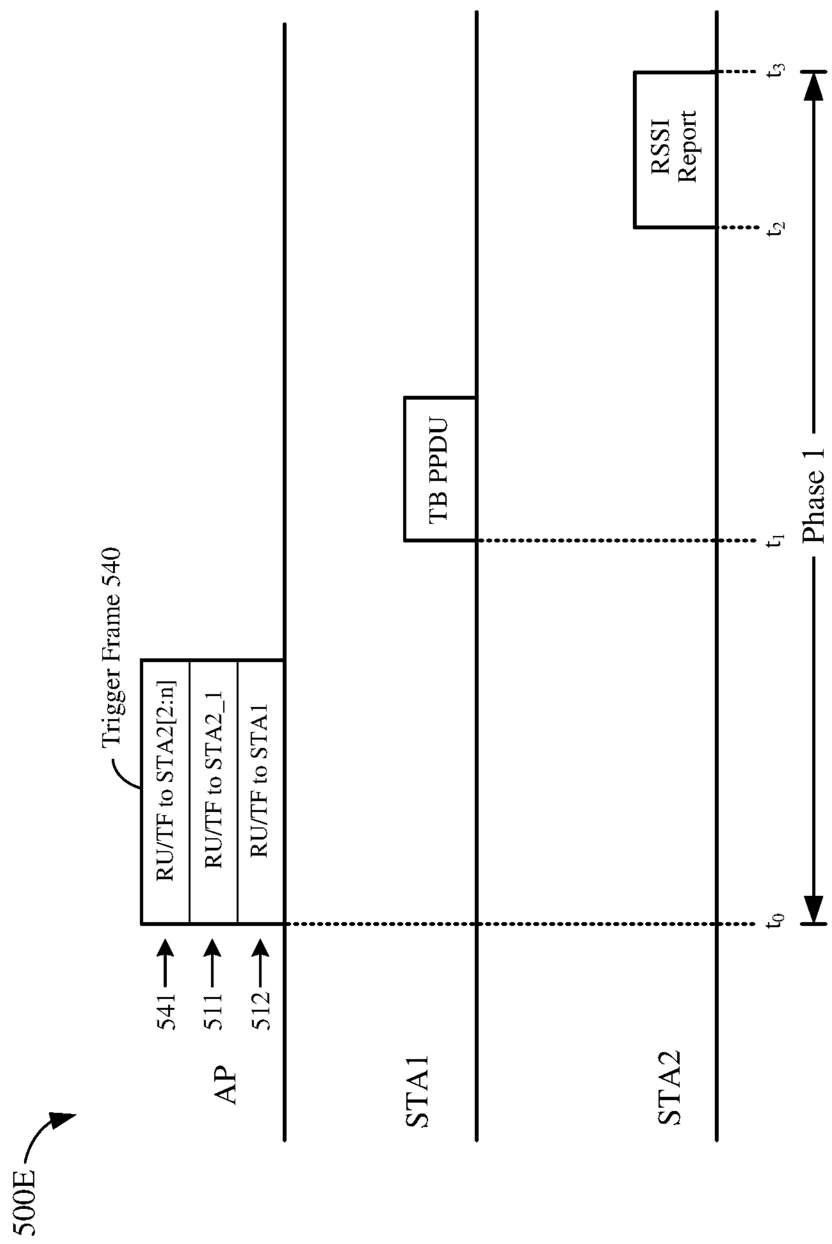

FIG. 5E shows a sequence diagram 500E depicting another example operation for wireless communication. The AP of FIG. 5E may be any suitable AP including, for example, the AP 102 of FIGS. 1A-1B or the AP 300 of FIG. 3. Each of the first stations STA1 of FIG. 5E may be any suitable wireless station including, for example, the STAs 104 of FIG. 1A, the first station STA1 of FIG. 1B, or the STA 200 of FIG. 2. Each of the second stations STA2 of FIG. 5E may be any suitable wireless station including, for example, the STAs 104 of FIG. 1A, the second station STA2 of FIG. 1B, or the STA 200 of FIG. 2. For the example of FIG. 5E, Phase 1 corresponds to the time period between times $t_0$ and $t_3$.

The sequence diagram 500E is similar to Phase 1 of the sequence diagram 500A of FIG. 5A in some aspects, and is different from Phase 1 of the sequence diagram 500A in other aspects. One difference is that rather than transmitting Frame 0, Frame 1, and Frame 4 of FIG. 5A separately, the AP of FIG. 5E may transmit information contained in Frame 0, Frame 1, and Frame 4 as a trigger frame 540. In some implementations, the trigger frame 540 may include the first frame 511, the second frame 512, and one or more additional frames 541. In some implementations, the first frame 511 may assign an RU to a corresponding one of the one or more second stations STA2, and may solicit UL transmission of a TB PPDU from the corresponding second station STA2_1. The second frame 512 may assign RUs to the one or more first stations STA1, and may instruct the one or more first stations STA1 to measure RSSI values. Each of the additional frames 541 may assign an RU to a corresponding one of the other second stations STA2_2 to STA2_*n*, and may solicit UL transmission of a TB PPDU from the corresponding one of the other second stations STA2_2 to STA2_*n*.

Figure 5F:
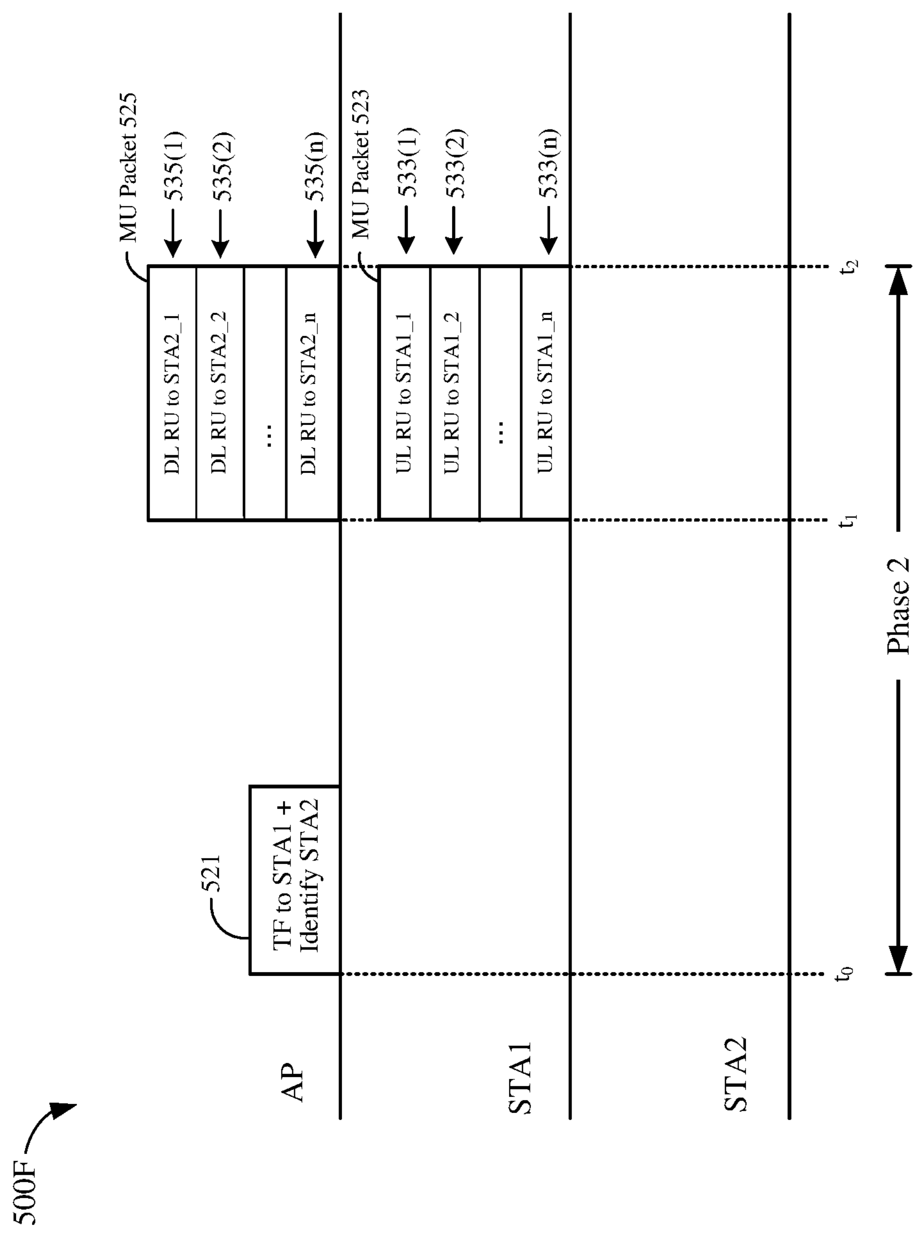

FIG. 5F shows a sequence diagram 500F depicting another example operation for wireless communication. The AP of FIG. 5F may be any suitable AP including, for example, the AP 102 of FIGS. 1A-1B or the AP 300 of FIG. 3. Each of the first stations STA1 of FIG. 5F may be any suitable wireless station including, for example, the STAs 104 of FIG. 1A, the first station STA1 of FIG. 1B, or the STA 200 of FIG. 2. Each of the second stations STA2 of FIG. 5F may be any suitable wireless station including, for example, the STAs 104 of FIG. 1A, the second station STA2 of FIG. 1B, or the STA 200 of FIG. 2. For the example of FIG. 5F, Phase 2 corresponds to the time period between times $t_0$ and $t_2$.

The sequence diagram 500F is similar to Phase 2 of the sequence diagram 500A of FIG. 5A in some aspects and differs from Phase 2 of the sequence diagram 500A in other aspects. For purposes of discussion herein, a trigger frame 521, an MU packet 523, and an MU packet 525, may generally correspond to Frame 6, Frame 7, and Frame 8, respectively, of FIG. 5A.

At time $t_0$, the AP may transmit the trigger frame 521. In some implementations, the trigger frame 521 may solicit UL transmissions from each of the one or more first stations STA1, and may identify the one or more second stations STA2 selected for DL transmissions.

At time $t_1$, the AP may transmit the MU packet 525 to the one or more second stations STA2 while concurrently receiving the MU packet 523 from the one or more first stations STA1. In some implementations, the MU packet 523 may be a TB PPDU, and may include as many as n UL RUs 533(1)-533(*n*), for example, to be allocated to the one or more first stations STA1_1 to STA1_*n* for UL transmissions to the AP. The MU packet 525 may be a DL PPDU, and may include as many as n DL RUs 535(1)-535(*n*), for example, to be allocated to the one or more second stations STA2_1 to STA2_*n* for DL transmissions from the AP.

Figure 5G:
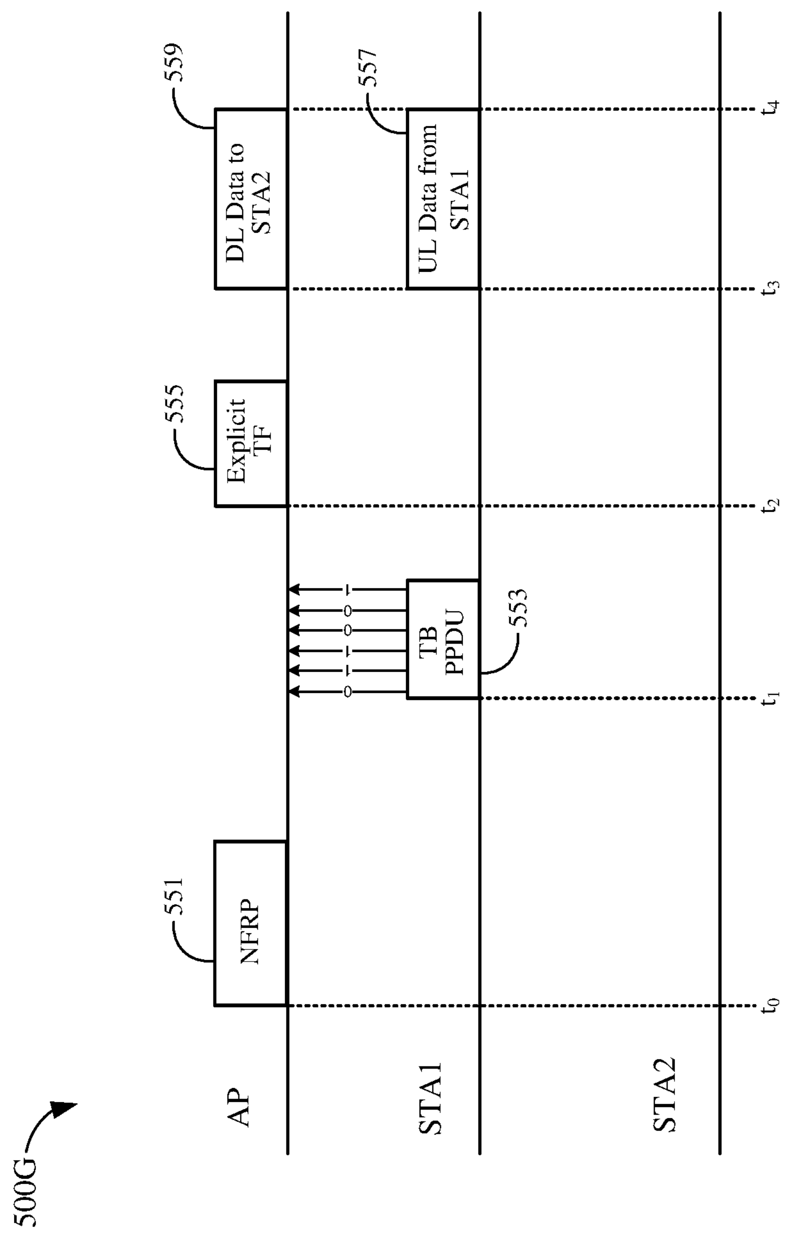

FIG. 5G shows a sequence diagram 500G depicting another example operation for wireless communication. The AP of FIG. 5G may be any suitable AP including, for example, the AP 102 of FIGS. 1A-1B or the AP 300 of FIG. 3. Each of the first stations STA1 of FIG. 5G may be any suitable wireless station including, for example, the STAs 104 of FIG. 1A, the first station STA1 of FIG. 1B, or the STA 200 of FIG. 2. Each of the second stations STA2 of FIG. 5G may be any suitable wireless station including, for example, the STAs 104 of FIG. 1A, the second station STA2 of FIG. 1B, or the STA 200 of FIG. 2.

The sequence diagram 500G is similar to Phase 2 of the sequence diagram 500A of FIG. 5A in some aspects and differs from Phase 2 of the sequence diagram 500A in other aspects. At time to, the AP may transmit a Null Data Packet (NDP) Feedback Report Poll (NFRP) 551 that includes the information contained in Frame 1 and Frame 2 of FIG. 5A. In some implementations, the NFRP 551 may trigger each of the first stations STA1 to determine whether they satisfy one or more requirements (such as a measured RSSI value meeting or exceeding the upper threshold RSSI).

At time $t_1$, each of the triggered first stations STA1 transmits an UL TB PPDU 553 to the AP. In some implementations, each of the triggered first stations STA1 may include an indicator bit in the TB PPDU 553 that indicates whether the corresponding one of the first stations STA1 has queued UL data for transmission to the AP. In some aspects, an indicator bit value of "1" indicates that the corresponding one of the first stations STA1 has queued UL data for transmission to the AP, and an indicator bit value of "0" indicates that the corresponding one of the first stations STA1 does not have queued UL data for transmission to the AP. For the example of FIG. 5G, the TB PPDU 553 includes six example indicator bits corresponding to six of the first stations STA1. One or more of the second stations STA2 may measure RSSI values of the NFRP 551 and measure RSSI values of the UL TB PPDU 553, for example, based on instructions or requests contained in the NFRP 551.

In some implementations, the AP may identify one or more of the second stations STA2 to receive DL data from the AP ("the number of second STAs") based at least in part on an amount of queued DL data in the AP. In addition, or in the alternative, the AP may determine one or more DL transmission parameters (such as a modulation and coding scheme (MCS) value, a transmission power, and an interference threshold), may determine one or more UL transmission parameters (such as an upper RSSI limit), or both. The AP may transmit the one or more UL transmission parameters to the first stations STA1 in the NFRP 551, and may select one or more of the first stations STA1 for UL transmissions based on reception of the TB PPDU 553.

At time $t_2$, the AP transmits an explicit trigger frame (TF) 555 that solicits UL data transmissions 557 from the selected one or more first stations STA1. In some implementations, the explicit trigger frame 555 may identify each of the one or more first stations STA1 selected for UL transmissions concurrent with DL transmissions to one or more of the second stations STA2.

At time $t_3$, the AP may transmit DL data 559 to the one or more second stations STA2 concurrently with receiving the UL data 557 (or at least a portion thereof) from the one or more selected first stations STA1.

The sequence diagrams 500A-500F of FIGS. 5A-5F, respectively, pertain to the first scenario in which the AP considers UL data transmitted from the one or more first stations STA1 as a "primary transmission" and considers DL data transmitted to the one or more second stations STA2 as a "secondary transmission"). The sequence diagram 500G of FIG. 5G pertains to the second scenario in which the AP considers DL data transmitted to the one or more second stations STA2 as a "primary transmission" and considers UL data transmitted from the one or more first stations STA1 as a "secondary transmission").

Figure 6A:
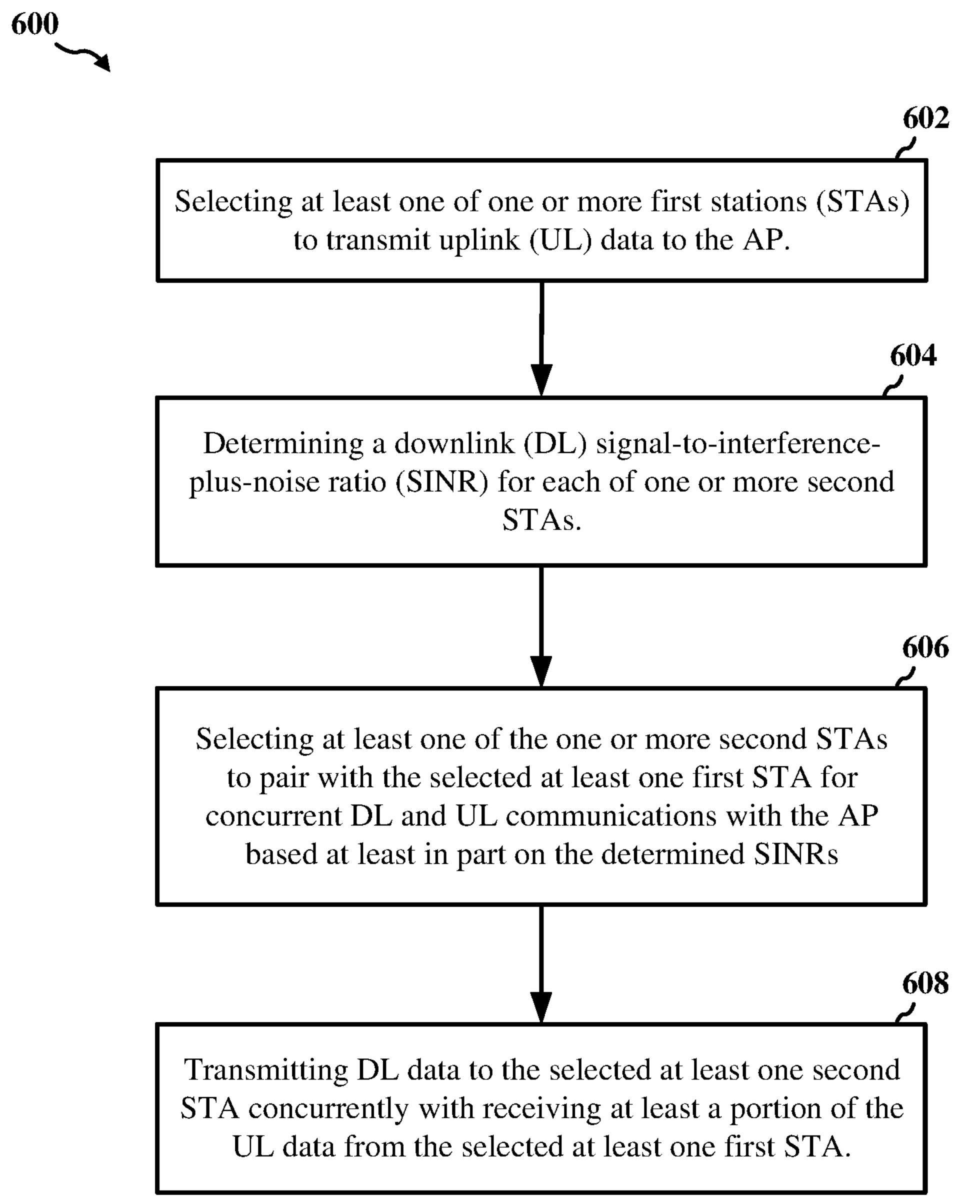
FIG. 6A shows a flowchart illustrating an example process for wireless communication that supports concurrent uplink (UL) and downlink (DL) communications according to some implementations.

FIG. 6A shows a flowchart illustrating an example process 600 for wireless communication that supports concurrent UL and DL communications according to some implementations. In some implementations, the example process 600 may be performed by a wireless communication device operating as or within an AP, such as one of the APs 102 and 300 described above with reference to FIGS. 1A and 3, respectively. For the example of FIG. 6A, each of the first STAs may be further from the AP than each of the second STAs, and each of the first STAs may have a greater pathloss than each of the second STAs.

The process 600 may begin in block 602 with selecting at least one of one or more first stations (STAs) to transmit UL data to the AP. In some implementations, the AP may determine an UL SINR for each of the one or more first STAs, and may select the at least one first STA based at least in part on the determined UL SINRs (such as by selecting the at least one first STA based on having a greater SINR than each of the other first STAs). In block 604, the process 600 proceeds with determining a DL SINR for each of one or more second STAs. In some implementations, the DL SINR for a respective second STA may be based on a difference between a signal strength of the AP at the respective second STA and an amount of interference from the selected at least one first STA at the respective second STA. In block 606, the process 600 proceeds with selecting at least one of the second STAs to pair with the selected at least one first STA for concurrent (or at least overlapping) DL and UL communications with the AP based at least in part on the determined SINRs. In block 608, the process 600 proceeds with transmitting DL data to the selected at least one second STA concurrently with receiving at least a portion of the UL data from the selected at least one first STA.

In some implementations, the UL data may be received from the selected at least one first STA on a first wireless channel, and the DL data may be transmitted to the selected at least one second STA on a second wireless channel different from the first wireless channel. In some aspects, the first and second wireless channels may occupy different portions of a particular frequency band (such as the first wireless channel occupying a lower portion of the 5 GHz frequency band and the second wireless channel occupying an upper portion of the 5 GHz frequency band). In other aspects, the first and second wireless channels may be located in different frequency bands (such as the first wireless channel located within the 5 GHz frequency band while the second wireless channel is located within the 6 GHz frequency band).

In other implementations, the UL data may be received from the selected at least one first STA on a first set of RUs associated with a frequency band, and the DL data may be transmitted to the selected at least one second STA on a second set of RUs associated with the frequency band. In some other implementations, the DL data may be transmitted to the selected at least one second STA on the same frequency band, sub-band, or segment used for concurrent UL transmissions from the selected at least one first STA.

Figure 6B:
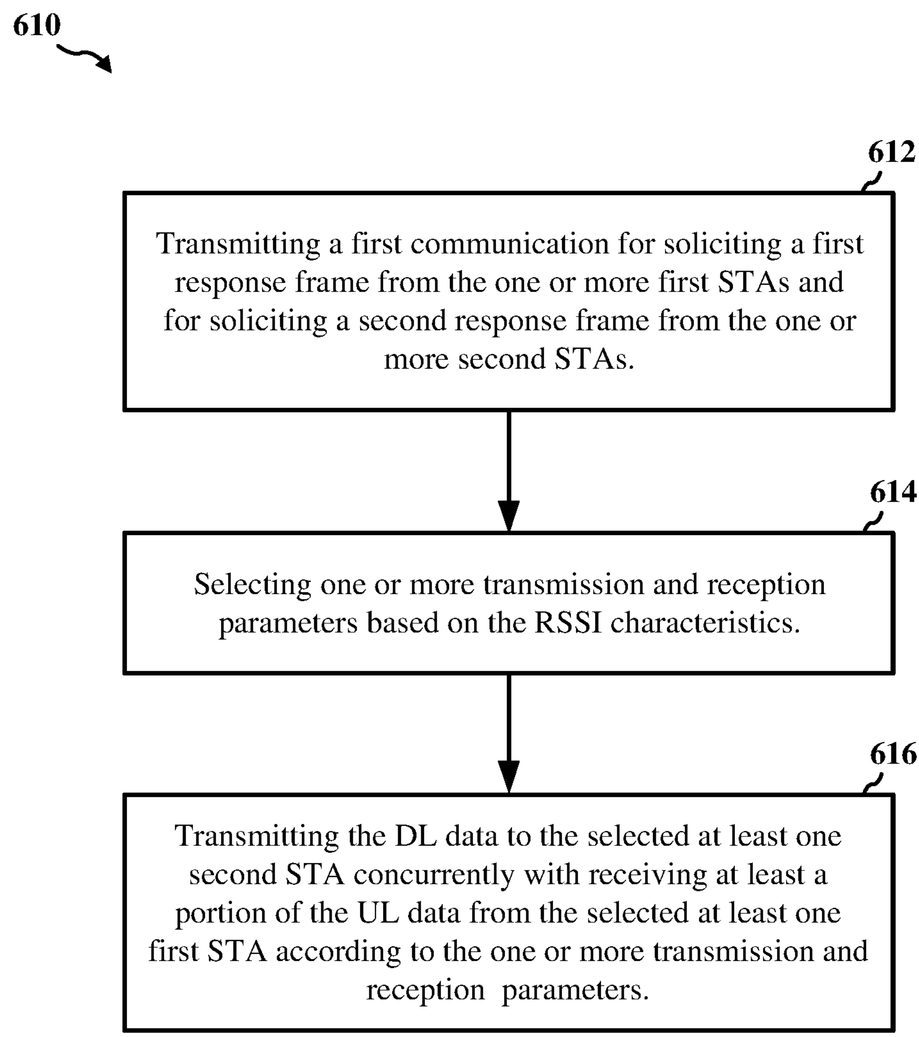
FIG. 6B shows a flowchart illustrating an example process for wireless communication that supports concurrent UL and DL communications according to some implementations.

FIG. 6B shows a flowchart illustrating an example process 610 for wireless communication that supports concurrent UL and DL communications according to some implementations. In some implementations, the example process 610 may be performed by a wireless communication device operating as or within an AP, such as one of the APs 102 and 300 described above with reference to FIGS. 1A and 3, respectively. In some implementations, the process 610 begins after the process 600 described with reference to FIG. 6A. For example, the process 610 may begin, in block 612, after transmitting DL data to the selected at least one second STA concurrently with receiving at least a portion of the UL data from the selected at least one first STA in block 608 of the process 600.

In block 612, the process 610 begins with transmitting a first communication for soliciting a first response frame from the one or more first STAs and for soliciting a second response frame from the one or more second STAs. In block 614, the process 610 proceeds with selecting one or more transmission and reception parameters based on the RSSI characteristics. In block 616, the process 610 proceeds with transmitting the DL data to the selected at least one second STA concurrently with receiving at least a portion of the UL data from the selected at least one first STA according to the one or more transmission and reception parameters.

Figure 7A:
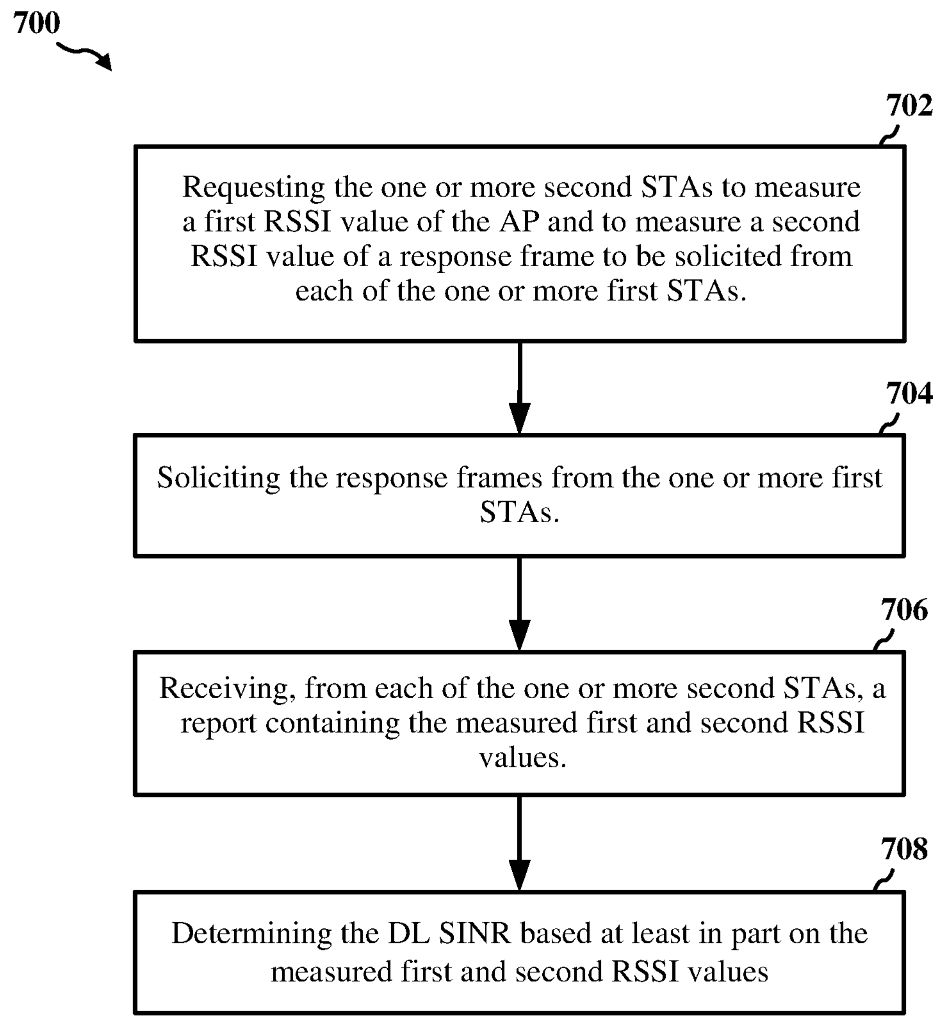
FIG. 7A shows a flowchart illustrating an example process for wireless communication that supports concurrent UL and DL communications according to some implementations.

FIG. 7A shows a flowchart illustrating an example process 700 for wireless communication that supports concurrent UL and DL communications according to some implementations. In some implementations, the example process 700 may be performed by a wireless communication device operating as or within an AP, such as one of the APs 102 and 300 described above with reference to FIGS. 1A and 3, respectively. In various aspects, the example process 700 of FIG. 7A may be one implementation for determining the DL SINR in block 604 of the process 600 of FIG. 6A.

The process 700 may begin in block 702 with requesting the one or more second STAs to measure a first RSSI value of the AP and to measure a second RSSI value of a response frame to be solicited from each of the one or more first STAs. In block 704, the process 700 proceeds with soliciting the response frames from the one or more first STAs. In block 706, the process 700 proceeds with receiving, from each of the one or more second STAs, a report containing the measured first and second RSSI values. In block 708, the process 700 proceeds with determining the DL SINR based at least in part on the measured first and second RSSI values.

In some implementations, the requesting in block 702 and the soliciting in block 704 may be performed together (such as concurrently) by transmitting a DL MU frame that requests each of the one or more second STAs to measure the RSSI values and that solicits response frames from each of the one or more first STAs. For example, the AP may transmit a DL MU PPDU containing a request for each of the one or more second STAs to measure RSSI values of the DL MU PPDU transmitted from the AP, and to measure RSSI values of the response frames solicited from the one or more first STAs.

In some implementations, the report containing the measured RSSI values may be transmitted to the AP as a TB PPDU. In other implementations, the report may be transmitted to the AP in another suitable MU packet. In some other implementations, each of the STAs that measured RSSI values based on the request from the AP may transmit a report containing the measured RSSI values in a single-user (SU) packet.

Figure 7B:
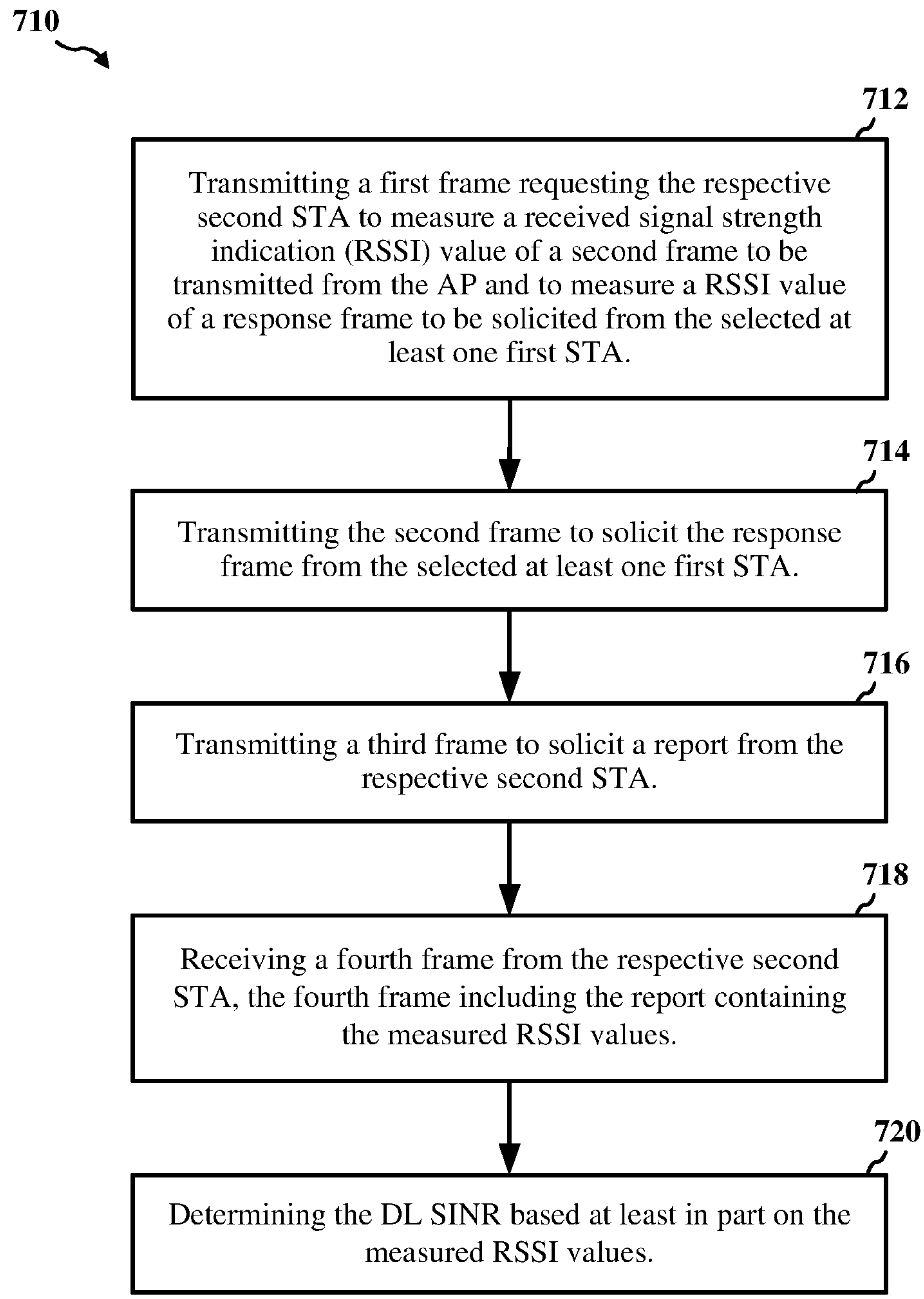
FIG. 7B shows a flowchart illustrating an example process for wireless communication that supports concurrent UL and DL communications according to some implementations.

In some implementations, the AP may calculate the SINR values based on the measured RSSI values contained in the reports received from the one or more first STAs and from the one or more second STAs. In other implementations, the one or more second stations STA2 may calculate at least some of the SINR values based on the measured first and second RSSI values, and may include the calculated SINR value(s) in the RSSI Report. In some other implementations, the RSSI Report may include the calculated SINR values but not the measured first and second RSSI values FIG. 7B shows a flowchart illustrating an example process 710 for wireless communication that supports concurrent UL and DL communications according to some implementations. In some implementations, the example process 710 may be performed by a wireless communication device operating as or within an AP, such as one of the APs 102 and 300 described above with reference to FIGS. 1A and 3, respectively. In various aspects, the process 710 may be one implementation of determining the DL SINR in block 604 of the process 600 of FIG. 6A.

The process 710 may begin in block 712 with transmitting a first frame requesting a respective second STA to measure an RSSI value of a second frame to be transmitted from the AP and to measure an RSSI value of a response frame to be solicited from the selected at least one first STA. In block 714, the process 710 proceeds with transmitting the second frame to solicit the response frame from the selected at least one first STA. In block 716, the process 710 proceeds with transmitting a third frame to solicit a report containing the measured RSSI values from the respective second STA. In block 718, the process 710 proceeds with receiving, from at least the respective second STA, a fourth frame including the report containing the measured RSSI values. In block 720, the process 710 proceeds with determining the DL SINR based at least in part on the measured RSSI values.

In some implementations, the first frame in block 712 may indicate one or more of the first STAs to be monitored by one or more of the second STAs, the channel segments, links, frequency bands, or resource units (RUs) to be monitored by the one or more second STAs, an amount of time during which each of the one or more second STAs is to monitor transmissions from the one or more first STAs, or any combination thereof. The first frame may also allocate one or more first RUs to the one or more first STAs, and may allocate one or more second RUs to the one or more second STAs.

In some implementations, the first frame in block 712 may be a broadcast trigger frame transmitted across the one or more second RUs and including instructions for each of the one or more second STAs to measure RSSI values on a corresponding one of the second RUs. In other implementations, the first frame in block 712 may be one or more unicast trigger frames each transmitted using a different one of the second RUs and including instructions for an identified one of the one or more second STAs to measure RSSI values on a corresponding one of the second RUs.

In some implementations, the second frame in block 714 may be one of a power-save (PS) poll frame, a ready-to-send (RTS) frame, or a trigger frame. In other implementations, the second frame in block 714 may be a broadcast trigger frame transmitted across the one or more first RUs and allocating the one or more first RUs to the one or more first STAs. In some other implementations, the second frame in block 714 may be or include a number of trigger frames each transmitted using a different one of the second RUs and allocating an identified one of the first RUs to a corresponding one of the one or more first STAs.

In some implementations, the first and second frames may be transmitted by the AP as separate frames or in separate packets. In other implementations, the first and second frames may be aggregated and transmitted together by the AP in a DL MU PPDU using a plurality of RUs. For example, the first frame may be a first physical-layer service data unit (PSDU) transmitted using one or more first RUs, and the second frame may be a second PSDU transmitted using one or more second RUs.

In some implementations, the third frame in block 716 may be a trigger frame that identifies the respective second STA and causes the respective second STA to transmit a report containing the measured RSSI values to the AP.

In some implementations, the fourth frame in block 718 may be a TB PPDU including the report that contains the measured RSSI values. In other implementations, the fourth frame in block 718 may be another suitable MU packet. In some other implementations, the fourth frame in block 718 may be a single-user (SU) packet transmitted from each of the STAs that measured RSSI values.

Figure 7C:
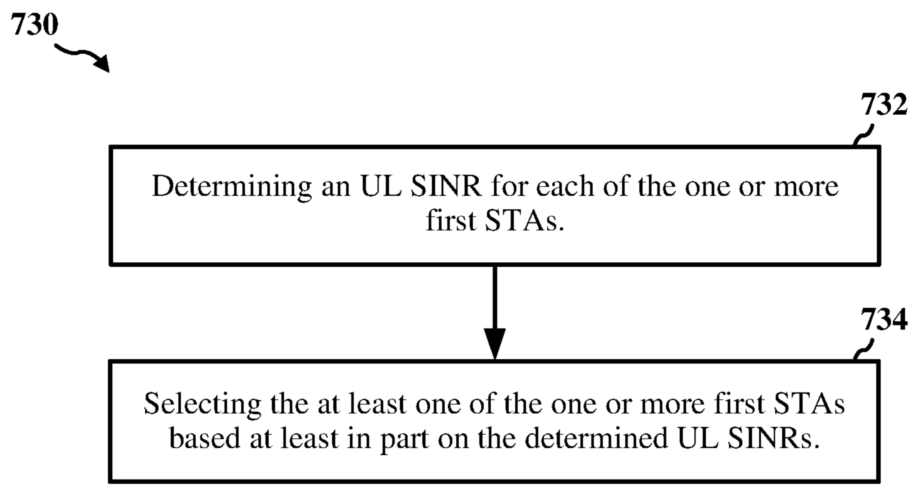
FIG. 7C shows a flowchart illustrating an example process for wireless communication that supports concurrent UL and DL communications according to some implementations.

FIG. 7C shows a flowchart illustrating an example process 730 for wireless communication that supports concurrent UL and DL communications according to some implementations. In some implementations, the example process 730 may be performed by a wireless communication device operating as or within an AP, such as one of the APs 102 and 300 described above with reference to FIGS. 1A and 3, respectively. In various aspects, the process 730 may be one implementation of selecting the at least one of the first STAs to transmit UL data in block 602 of the process 600 of FIG. 6A.

The process 730 may begin in block 732 with determining an UL SINR for each of the one or more first STAs. In block 734, the process 730 proceeds with selecting the at least one of the one or more first STAs based at least in part on the determined UL SINRs.

Figure 7D:
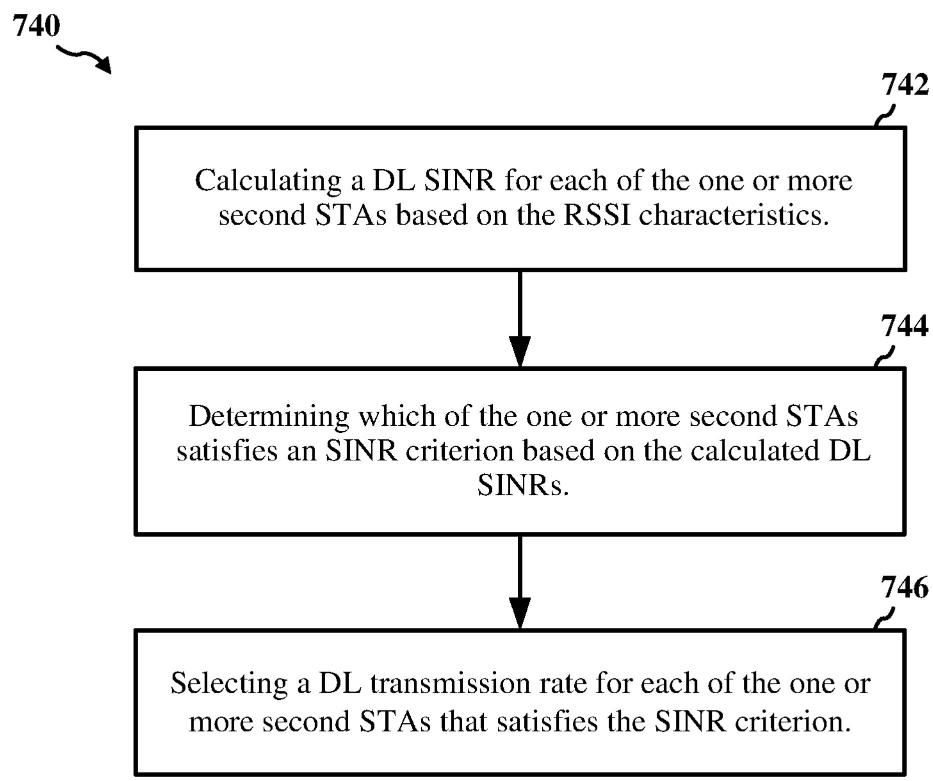
FIG. 7D shows a flowchart illustrating an example process for wireless communication that supports concurrent UL and DL communications according to some implementations.

FIG. 7D shows a flowchart illustrating an example process 740 for wireless communication that supports concurrent UL and DL communications according to some implementations. The process 740 may be performed by a wireless communication device. In some implementations, the example process 740 may be performed by a wireless communication device operating as or within an AP, such as one of the APs 102 and 300 described above with reference to FIGS. 1A and 3, respectively. In various aspects, the process 740 may be one implementation for determining the DL SINR in block 604 of the process 600 of FIG. 6A.

The process 740 begins in block 742 with calculating a DL SINR for each of the one or more second STAs based on the RSSI characteristics. In block 744, the process 740 proceeds with determining which of the one or more second STAs satisfies an SINR criterion based on the calculated DL SINRs. In block 744, the process 740 proceeds with selecting a DL transmission rate for each of the one or more second STAs that satisfies the SINR criterion, wherein the AP transmits the DL data to the selected at least one second STA according to its respective DL transmission rate.

Figures 8A, 8B:
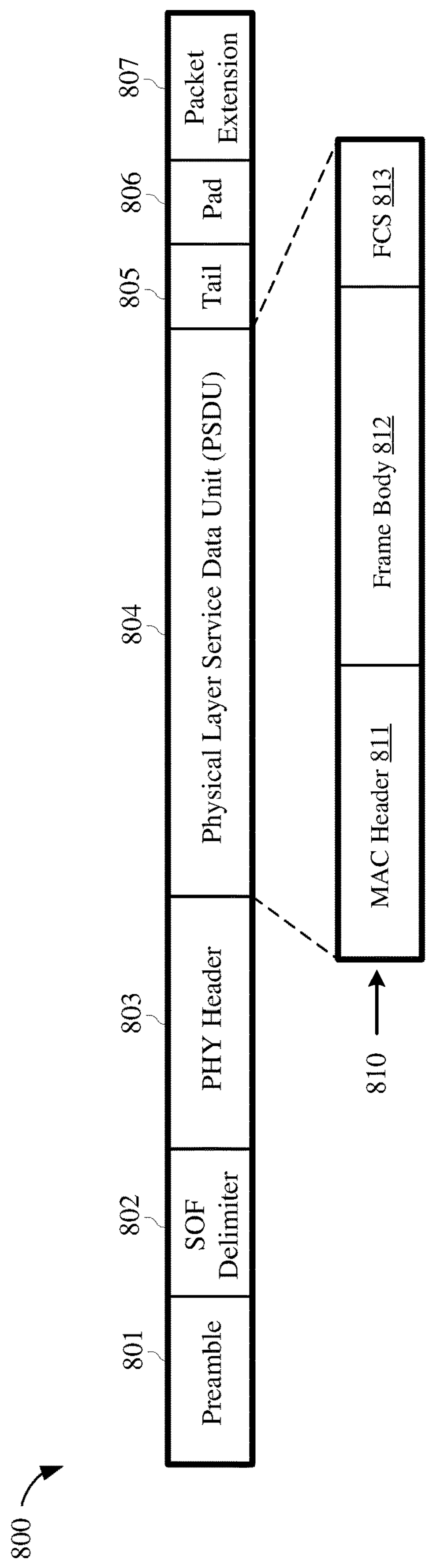
FIG. 8A shows an example high-efficiency (HE) multi-user (MU) physical-layer convergence protocol (PLCP) protocol data unit (PPDU).
FIG. 8B shows an example high efficiency (HE) preamble.

FIG. 8A shows an example packet 800. The packet 800, which may be a HE MU PPDU specified by the IEEE 802.11ax standards, may be used as the MU packets 510 and 520 of FIGS. 5B and 5C, respectively. The packet 800 is shown to include a preamble 801, a start of frame (SOF) delimiter 802, a physical-layer (PHY) header 803, a Physical Layer Service Data Unit (PSDU) 804, a tail field 805, a pad field 806, and a packet extension 807.

The preamble 801 may include synchronization information, timing information, frequency offset correction information, and signaling information, for example, as described with respect to FIG. 8B. The SOF delimiter 802 may indicate the start of the data frame encapsulated within the packet 800. The PHY header 803 may include a number of fields for storing data rates, a reserved bit, a length of the PSDU 804, a parity bit, a number of tail bits, and service information. The PSDU 804 may contain a MAC Protocol Data Unit (MPDU) 810. The tail field 805 may include a number of tail bits, and the pad field 806 may include a number of pad bits.

The MPDU 810, which may be commonly referred to as a MAC frame, may be compliant with the IEEE 802.11 family of standards. The MPDU 810 includes a MAC header 811, a frame body 812, and a frame control sequence (FCS) field 813. The MAC header 811 may include a number of fields containing information that describes characteristics or attributes of data encapsulated within the frame body 812, may include a number of fields indicating source and destination addresses of the data encapsulated within the frame body 812, and may include a number of fields containing control information. In some implementations, the MAC header 811 may be used as the MAC header of any suitable data frame, control frame, management frame, and action frame. The frame body 812 may include a number of PSDUs such as data frames, control frames, management frames, or any combination thereof.

The packet extension 807 does not typically store any data. Instead, the packet extension 807 typically stores "dummy" data (such as repeating the last symbol of the packet payload), for example, to allow a receiving device more time to decode the packet 800 without giving up medium access granted to a transmitting device. In accordance with the subject matter described in this disclosure, the packet extension 807 may be used to store one or more HE-LTFs.

FIG. 8B shows an example high efficiency (HE) preamble 850. The HE preamble 850 may be one implementation of the preamble 801 of the packet 800 of FIG. 8A. The preamble 850, which in some aspects may be compliant with the IEEE 802.11ax standards, is shown to include a Legacy Short Training Field (L-STF) 851, a Legacy Long Training Field (L-LTF) 852, a Legacy Signal (L-SIG) field 853, a Repeated Legacy Signal (RL-SIG) field 854, a set of HE Signal-A (HE-SIG-A1/HE-SIG-A2) fields 855, an HE Signal B (HE-SIG-B) field 856, an HE Short Training Field (HE-STF) 857, and an HE Long Training Field (HE-LTF) 858.

The L-STF 851 may include information for coarse frequency estimation, automatic gain control, and timing recovery. The L-LTF 852 may include information for fine frequency estimation, channel estimation, and fine timing recovery. The L-SIG field 853 may include modulation and coding information. The HE-SIG-A1 and HE-SIG-A2 fields 855 may include parameters such as an indicated bandwidth, a payload guard interval (GI), a coding type, a number of spatial streams (Nsts), a space-time block coding (STBC), beamforming information, and so on. More specifically, the HE-SIG-A1 and HE-SIG-A2 fields 855 may include a set of fields to store parameters describing the type of information stored in the HE-LTF 858. For example, the set of fields includes (1) a CP+LTF Size field that stores a cyclic prefix (CP) value and a length of the HE-LTF 858; (2) an Nsts field to store information indicating the number spatial streams, (3) a STBC field store a value for space-time block coding, and (4) a transmit beamforming (TxBF) field to store information pertaining to beamforming.

The HE-SIG-B field 856 may include one or two HE-SIG-B content channels, with each HE-SIG-B content channel conveying user allocation for one or more 20 MHz subchannels. A 20 MHz HE MU PPDU may include one HE-SIG-B content channel, while an HE MU PPDU with greater than 20 MHz PPDU bandwidth may include two HE-SIG-B content channels. In each HE-SIG-B content channel, the number of spatial streams for a user in an RU may be indicated by the Nsts field in the User field (if there is only one User field). For purposes of discussion herein, the HE preamble 850 of the packet 800 (which includes the HE-SIG-B field 856) may generally correspond to all or a portion of one or more of the Frames 1-8 described with reference to FIGS. 5A-5G.

In some implementations, the HE preamble 850 of the packet 800 may identify particular STAs to the recipient of the HE preamble 850. In some aspects, the identified STAs may also be referred to herein as one or more of, or at least one of, the “candidate” STAs, as the “selected” STAs, as the “qualifying” STAs, as the number of first STAs, as the number of second STAs, as the one or more of the first STAs, as the one or more of the second STAs, as the number of STA1s, as the number of STA2*s*, etc., or any combination thereof, according to some implementations described herein. In addition, or in the alternative, in some aspects, the HE preamble 850 of the packet 800 may identify RU allocations for the identified STAs. As a non-limiting example, the AP may include a station ID value in the HE-SIG-B field 856 of the HE preamble 850 of the packet 800 to identify which STA is allocated (or “assigned”) to particular RUs. In some aspects, the corresponding STA may thus tune to the corresponding RU and decode the contents therein.

In some implementations, the HE-SIG-B field 856 of the packet 800 may include a value identifying the dedicated RU upon which discovery information of the AP is transmitted. The value may be an AID value that does not correspond to AID values assigned to associated stations. In some aspects, the value may be AID=2045, which is the AID value used in trigger frames to allocate random-access RUs to unassociated stations. In some aspects, the value may be AID=0, which is the AID value used (such as in a broadcast frame) to allocate RUs to associated STAs.

Information contained in the HE-STF 857 may be used to improve automatic gain control estimates for SU-MIMO and MU-MIMO communications, and information contained in the HE-LTF 858 may be used to estimate various MIMO channel conditions.

Figure 9:
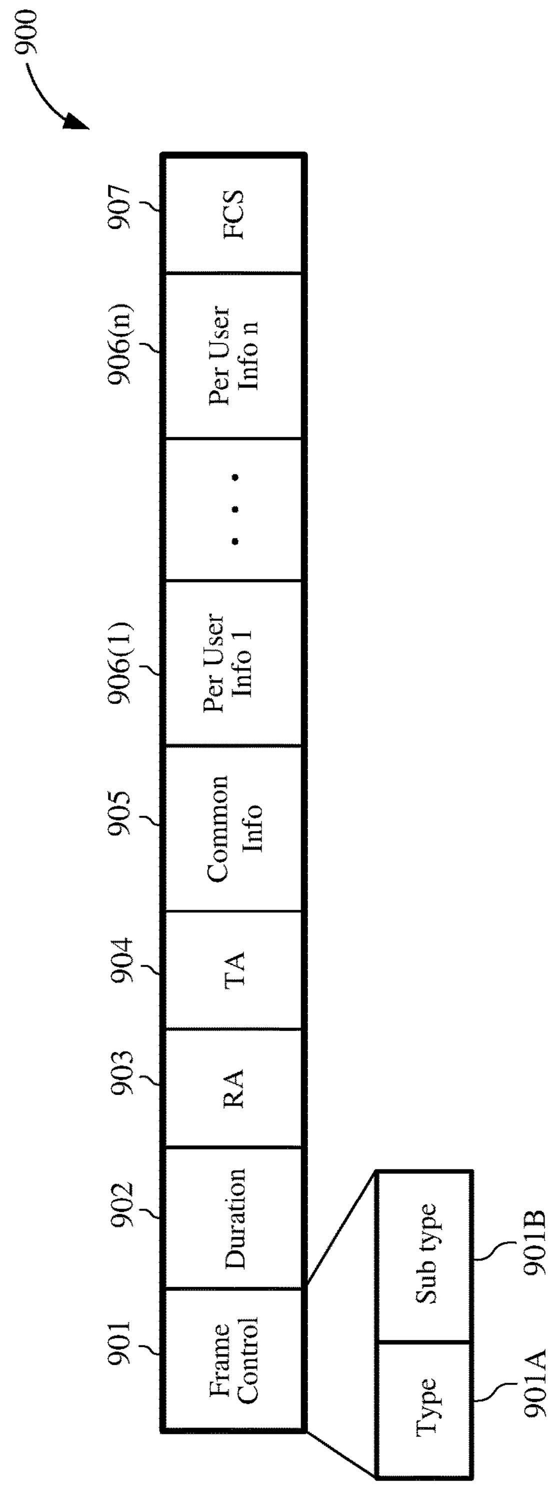
FIG. 9 shows an example trigger frame.

FIG. 9 shows an example trigger frame 900. The trigger frame 900 may be used as the trigger frames 511-512 of FIG. 5B, the trigger frame 520 of FIG. 5C, the trigger frames 511-512 of FIG. 5D, the trigger frame 540 of FIG. 5E, or the trigger frame 521 of FIG. 5F. The trigger frame 900 is shown to include a frame control field 901, a duration field 902, a receiver address (RA) field 903, a transmitter address (TA) field 904, a Common Info field 905, a number of Per User Info fields 906(1)-906(*n*), and a frame check sequence (FCS) field 907.

The frame control field 901 includes a Type field 901A and a Sub-type field 901B. The Type field 901A may store a value to indicate that the trigger frame 900 is a control frame, and the Sub-type field 901B may store a value indicating a type of the trigger frame 900. The duration field 902 may store information indicating a duration or length of the trigger frame 900. The RA field 903 may store the address of a receiving device (such as one of the second stations STA2 of FIGS. 5A-5G). The TA field 904 may store the address of a transmitting device (such as the AP of FIGS. 5A-5G). The Common Info field 905 may store information common to one or more receiving devices, as described in more detail below with respect to FIG. 10A. Each of the Per User Info fields 906(1)-906(*n*) may store information for a particular receiving device including, for example, the AID of the receiving device. The FCS field 907 may store a frame check sequence (such as for error detection).

For purposes of discussion herein, the trigger frame 900 (which includes the Common Info field 905) may generally correspond to all or a portion of one or more of the Frames 1-8 described in connection with FIGS. 5A-5H. As a non-limiting example, the trigger frame 900 may be an implementation of one or more of Frame 1 of FIG. 5A, the first frame 511 of FIG. 5B, Frame 2 of FIG. 5A, the second frame 512 of FIG. 5B, the trigger frame 520 of FIG. 5C, the trigger frame 540 of FIG. 5E, the trigger frame 521 of FIG. 5F), or the explicit trigger frame 555 of FIG. 5G. It will be understood that one or more of the other frames described herein may comprise implementations of the trigger frame 900.

In some implementations, the trigger frame 900 may identify particular STAs to the recipient of the trigger frame 900. In some aspects, the identified STAs may also be referred to herein as the “candidate” STAs, as the “selected” STAs, or as the “qualifying” STAs.

In some implementations, the trigger frame 900 may allocate dedicated RUs to associated STAs identified by AID values stored in corresponding ones of the Per User Info fields 906(1)-906(*n*). The trigger frame 900 may also allocate random RUs to one or more groups of STAs using pre-defined AID values stored in the Per User Info fields 906(1)-906(*n*). For example, setting AID=0 in a trigger frame may allocate random RUs to STAs associated with the Tx AP, while setting an AID=2045 in a trigger frame may allocate random RUs to non-associated STAs.

Figure 10A:
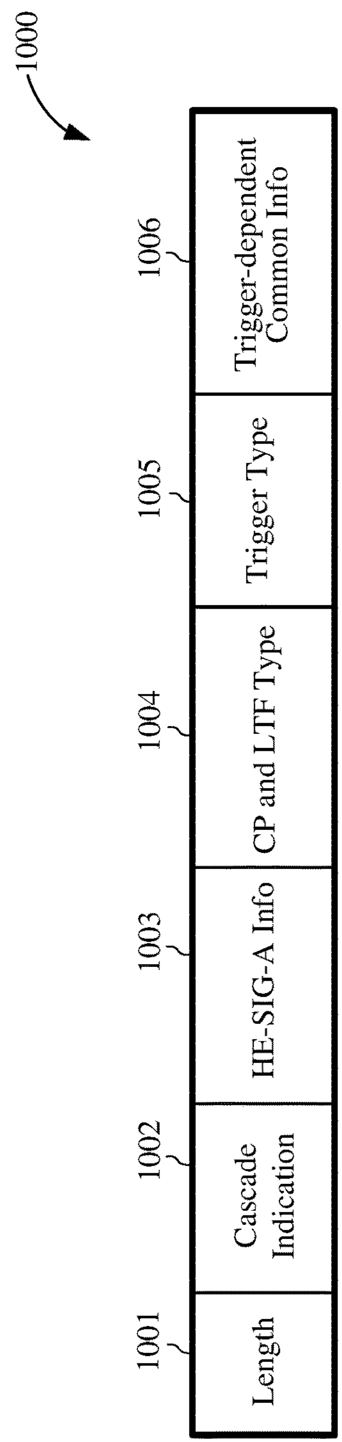
FIG. 10A shows an example Common Info field.

FIG. 10A shows an example Common Info field 1000. The Common Info field 1000 may be one implementation of the Common Info field 905 of the trigger frame 900. The Common Info field 1000 is shown to include a length subfield 1001, a cascade indication subfield 1002, a high-efficiency signaling A (HE-SIG-A) info subfield 1003, a cyclic prefix (CP) and legacy training field (LTF) type subfield 1004, a trigger type subfield 1005, and a trigger-dependent common info subfield 1006. The length subfield 1001 may indicate the length of a legacy signaling field of the UL data frames to be transmitted in response to the trigger frame 900. The cascade indication subfield 1002 may indicate whether a subsequent trigger frame follows the current trigger frame. The HE-SIG-A Info subfield 1003 may indicate the contents of a HE-SIG-A field of the UL data frames to be transmitted in response to the trigger frame 900. The CP and LTF type subfield 1004 may indicate the cyclic prefix and HE-LTF type of the UL data frames to be transmitted in response to the trigger frame 900. The trigger type subfield 1005 may indicate the type of trigger frame. The trigger-dependent common info subfield 1006 may indicate trigger-dependent information.

For purposes of discussion herein, the Common Info field 1000 (which includes the length subfield 1001) may generally correspond to all or a portion of one or more of the Frames 1-8 described in connection with FIGS. 5A-5G. In some implementations, the length subfield 1001 of the Common Info field 1000 may indicate a length of a TB PPDU (such as all or a portion of one or more of Frame 3, Frame 5, Frame 7, and the TB PPDU 553, among other frames). In some aspects, a first set of STAs may identify a second set of STAs for monitoring based on matching their STA ID to another value in the trigger frame 900, such as in one or more of the Per User Info Fields 906(1)-(*n*). In other aspects, a bit in the trigger frame 900 (such as in the Common Info field 1000) may indicate one or more additional fields (such as a padding field) including information for or about one or more STAs (such as the number of second STAs).

Figure 10B:
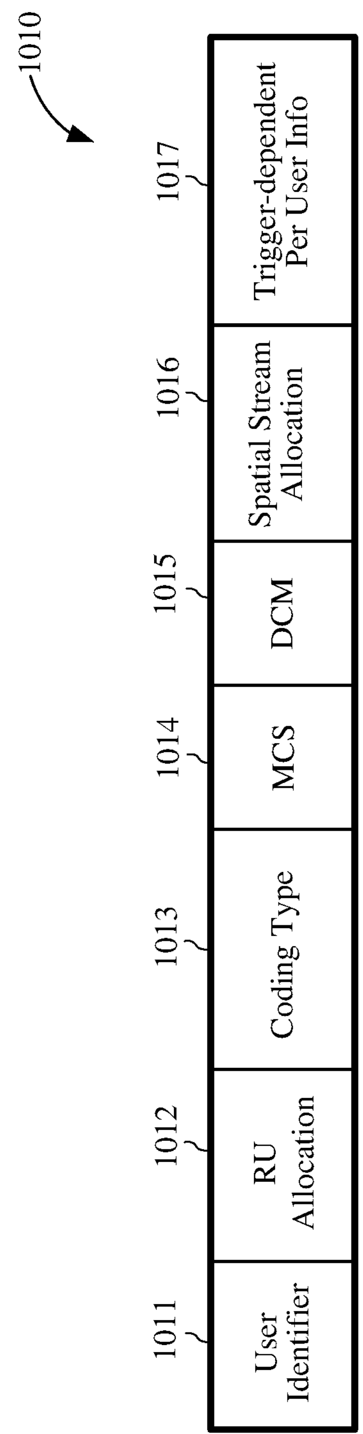
FIG. 10B shows an example Per User Info field.

FIG. 10B shows an example Per User Info field 1010. The Per User Info field 1010 may be one implementation of the Per User Info fields 906(1)-906(*n*) of the trigger frame 900. The Per User Info field 1010 is shown to include a User Identifier subfield 1011, an RU Allocation subfield 1012, a Coding Type subfield 1013, an MCS subfield 1014, a dual-carrier modulation (DCM) subfield 1015, a spatial stream (SS) Allocation subfield 1016, and a trigger-dependent Per User info subfield 1017. The User Identifier subfield 1011 may indicate the association identification (AID) of the STA to which a dedicated RU is allocated to transmit UL MU data. The RU Allocation subfield 1012 may identify the dedicated RU allocated to the corresponding STA (such as the STA identified by the User Identifier subfield 1011). The Coding Type subfield 1013 may indicate the type of coding to be used by the corresponding STA when transmitting UL data using the allocated RU. The MCS subfield 1014 may indicate the MCS to be used by the corresponding STA when transmitting UL data using the allocated RU. The DCM subfield 1015 may indicate the dual carrier modulation to be used by the corresponding STA when transmitting UL data using the allocated RU. The SS Allocation subfield 1016 may indicate the number of spatial streams to be used by the corresponding STA when transmitting UL data using the allocated RU.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of wireless communication performed by an access point (AP) device, comprising:

transmitting a first frame, the first frame requesting at least one second station (STA) to measure a first received signal strength indication (RSSI) value from a second frame to be transmitted from the AP device, and the first frame requesting the at least one second STA to measure a second RSSI value from at least one first response frame to be solicited from at least one first STA by the AP device, the second frame for RSSI measurement by the at least one second STA and for frame solicitation of the at least one first response frame by the at least one first STA in a single frame; and transmitting downlink (DL) data to the at least one second STA via a second link concurrently with receiving at least a portion of uplink (UL) data from the at least one first STA via a first link, the at least one first STA selected to transmit the UL data to the AP device via the first link, and the at least one second STA selected for the AP device to transmit the DL data to via the second link concurrently with receiving at least the portion of the UL data from the at least one first STA via the first link, the selection of the at least one second STA being associated with the first RSSI value of the second frame and the second RSSI value of the at least one first response frame.

2. The method of claim 1, wherein a DL signal-to-interference-plus-noise ratio (SINR) for the at least one second STA is associated with a difference between a signal strength of the AP device at the at least one second STA and an amount of interference from the selected at least one first STA at the at least one second STA, the signal strength associated with the first RSSI value, and the amount of interference associated with the second RSSI value, and wherein the selection of the at least one second STA for the AP device to transmit the DL data to is associated with the DL SINR.

3. The method of claim 1, further comprising:

receiving, from the at least one second STA, a report containing the first RSSI value and the second RSSI value; and determining a DL signal-to-interference-plus-noise ratio (SINR) associated with the first RSSI value and the second RSSI value, wherein the selection of the at least one second STA for the AP device to transmit the DL data to is associated with the DL SINR.

4. The method of claim 3, wherein the transmissions of the first frame and the second frame include a DL multi-user (MU) physical-layer protocol data unit (PPDU) containing at least the first frame requesting the at least one second STA to measure the first RSSI value and to measure the second RSSI value and the second frame soliciting the at least one first response frame from the at least one first STA.

5. The method of claim 1, further comprising, for a respective one of the at least one second STA:

transmitting the second frame to solicit the at least one first response frame from the selected at least one first STA;

transmitting a third frame to solicit a report from the respective second STA;

receiving a fourth frame from the respective second STA, the fourth frame comprising the report containing the first RSSI value or the second RSSI value; and determining a DL signal-to-interference-plus-noise ratio (SINR) associated with the first RSSI value or the second RSSI value, wherein the selection of the at least one second STA for the AP device to transmit the DL data to is associated with the DL SINR.

6. The method of claim 5, wherein the first frame indicates at least one of:

the at least one first STA to be monitored by the at least one second STA;

channel segments, links, frequency bands, or resource units (RUs) to be monitored by the at least one second STA; or an amount of time over which the at least one second STA is to monitor transmissions from the at least one first STA.

7. The method of claim 5, wherein the first frame and the second frame are transmitted together within a DL multi-user (MU) physical-layer protocol data unit (PPDU), the first frame comprises a first physical-layer service data unit (PSDU) transmitted using one or more first resource units (RUs), and the second frame comprises a second PSDU transmitted using one or more second RUs.

8. The method of claim 5, wherein the first frame allocates one or more first resource units (RUs) to the at least one first STA, allocates one or more second RUs to the at least one second STA, and comprises at least one of:

a broadcast trigger frame transmitted across the one or more second RUs and including instructions for the at least one second STA to measure RSSI values on a corresponding one of the one or more second RUs; or a number of unicast trigger frames each transmitted using a different one of the one or more second RUs and including instructions for an identified one of the at least one second STA to measure RSSI values on a corresponding one of the one or more second RUs.

9. The method of claim 8, wherein the second frame comprises at least one of:

a broadcast trigger frame transmitted across the one or more first RUs and allocating the one or more first RUs to the at least one first STA; or a number of trigger frames each transmitted using a different one of the one or more second RUs and allocating an identified one of the one or more first RUs to a corresponding one of the at least one first STA.

10. The method of claim 1, wherein the selection of the at least one first STA comprises:

determining an UL signal-to-interference-plus-noise ratio (SINR) for the at least one first STA, the selection of the at least one first STA associated with the determined UL SINR.

11. The method of claim 1, wherein a first communication that includes the second frame for soliciting the at least one first response frame from the at least one first STA is to solicit a second response frame from the at least one second STA, wherein the second response frame includes RSSI characteristics that indicate the first RSSI value associated with the first communication and the second RSSI value associated with the at least one first response frame, the method further comprising:

selecting one or more transmission and reception parameters associated with the RSSI characteristics, wherein the transmission of the DL data to the at least one second STA concurrently with the reception of at least the portion of the UL data from the selected at least one first STA is in accordance with the one or more transmission and reception parameters.

12. The method of claim 11, wherein the selection of the one or more transmission and reception parameters comprises:

determining a DL signal-to-interference-plus-noise ratio (SINR) for the at least one second STA associated with the RSSI characteristics that indicate the first RSSI value and the second RSSI value;

determining which of the at least one second STA satisfies an SINR criterion associated with the determined DL SINR; and selecting a DL transmission rate for the at least one second STA that satisfies the SINR criterion, wherein the AP device transmits the DL data to each of the at least one second STA according to the DL transmission rate associated with each of the at least one second STA.

13. The method of claim 12, wherein the first communication comprises a DL multi-user (MU) physical-layer protocol data unit (PPDU) including at least the first frame and the second frame.

14. The method of claim 1, wherein the DL data is transmitted to the at least one second STA on a first wireless channel, and the UL data is received from the selected at least one first STA on a second wireless channel different than the first wireless channel.

15. An access point (AP) device comprising:
a processing system that includes processor circuitry and memory circuitry that stores code, the processing system configured to cause the AP device to:
transmit a first frame, the first frame requesting at least one second station (STA) to measure a first received signal strength indication (RSSI) value from a second frame to be transmitted from the AP device, and the first frame requesting the at least one second STA to measure a second RSSI value from at least one first response frame to be solicited from at least one first STA by the AP device, the second frame for RSSI measurement by the at least one second STA and for frame solicitation of the at least one first response frame by the at least one first STA in a single frame; and
transmit downlink (DL) data to the at least one second STA via a second link concurrently with receiving at least a portion of uplink (UL) data from the at least one first STA via a first link, the at least one first STA selected to transmit the UL data to the AP device via the first link, and the at least one second STA selected for the AP device to transmit the DL data to via the second link concurrently with receiving at least the portion of the UL data from the at least one first STA via the first link, the selection of the at least one second STA being associated with the first RSSI value of the second frame and the second RSSI value of the at least one first response frame.

16. The AP device of claim 15, wherein a DL signal-to-interference-plus-noise ratio (SINR) for the at least one second STA is associated with a difference between a signal strength of the AP device at the at least one second STA and an amount of interference from the selected at least one first STA at the at least one second STA, the signal strength associated with the first RSSI value, and the amount of interference associated with the second RSSI value, and wherein the selection of the at least one second STA for the AP device to transmit the DL data to is associated with the DL SINR.

17. The AP device of claim 15, wherein the processing system is further configured to cause the AP device to:
receive, from the at least one second STA, a report containing the first RSSI value and the second RSSI value; and
determine a DL signal-to-interference-plus-noise ratio (SINR) associated with the first RSSI value and the second RSSI value, wherein the selection of the at least one second STA for the AP device to transmit the DL data to is associated with the DL SINR.

18. The AP device of claim 17, wherein the transmissions of the first frame and the second frame include a DL multi-user (MU) physical-layer protocol data unit (PPDU) containing at least the first frame requesting the at least one second STA to measure the first RSSI value and the second RSSI value and the second frame soliciting the at least one first response frame from the at least one first STA.

19. The AP device of claim 15, wherein the processing system is further configured to cause the AP device to, for a respective one of the at least one second STA:
transmit the second frame to solicit the at least one first response frame from the selected at least one first STA;
transmit a third frame to solicit a report from the respective second STA;
receive a fourth frame from the respective second STA, the fourth frame comprising the report containing the first RSSI value or the second RSSI value; and
determine a DL signal-to-interference-plus-noise ratio (SINR) associated with the first RSSI value or the second RSSI value, wherein the selection of the at least one second STA for the AP device to transmit the DL data to is associated with the DL SINR.

20. The AP device of claim 19, wherein the first frame indicates at least one of:
the at least one first STA to be monitored by the at least one second STA;
channel segments, links, frequency bands, or resource units (RUs) to be monitored by the at least one second STA; or
an amount of time over which the at least one second STA is to monitor transmissions from the at least one first STA.

21. The AP device of claim 19, wherein the first frame and the second frame are transmitted together within a DL multi-user (MU) physical-layer protocol data unit (PPDU), the first frame comprises a first physical-layer service data unit (PSDU) transmitted using one or more first resource units (RUs), and the second frame comprises a second PSDU transmitted using one or more second RUs.

22. The AP device of claim 19, wherein the first frame allocates one or more first resource units (RUs) to the at least one first STA, allocates one or more second RUs to the at least one second STA, and comprises at least one of:
a broadcast trigger frame transmitted across the one or more second RUs and including instructions for the at least one second STA to measure RSSI values on a corresponding one of the one or more second RUs; or
a number of unicast trigger frames each transmitted using a different one of the one or more second RUs and including instructions for an identified one of the at least one second STA to measure RSSI values on a corresponding one of the one or more second RUs.

23. The AP device of claim 22, wherein the second frame comprises at least one of:
a broadcast trigger frame transmitted across the one or more first RUs and allocating the one or more first RUs to the at least one first STA; or
a number of trigger frames each transmitted using a different one of the one or more second RUs and allocating an identified one of the one or more first RUs to a corresponding one of the at least one first STA.

24. The AP device of claim 15, wherein, for the selection of the at least one first STA, the processing system is configured to cause the AP device to:
determine an UL signal-to-interference-plus-noise ratio (SINR) for the at least one first STA, the selection of the at least one first STA associated with the determined UL SINR.

25. The AP device of claim 15, wherein a first communication that includes the second frame for soliciting the at least one first response frame from the at least one first STA is to solicit a second response frame from the at least one second STA, wherein the second response frame includes RSSI characteristics that indicate the first RSSI value associated with the first communication and the second RSSI value associated with the at least one first response frame, and wherein the processing system is further configured to cause the AP device to:

select one or more transmission and reception parameters associated with the RSSI characteristics, wherein the transmission of the DL data to the at least one second STA concurrently with the reception of at least the portion of the UL data from the selected at least one first STA is in accordance with the one or more transmission and reception parameters.

26. The AP device of claim 25, wherein for the selection of the one or more transmission and reception parameters, the processing system is configured to cause the AP device to:

determine a DL signal-to-interference-plus-noise ratio (SINR) for the at least one second STA associated with the RSSI characteristics that indicate the first RSSI value and the second RSSI value;

determine which of the at least one second STA satisfies an SINR criterion associated with the determined DL SINR; and select a DL transmission rate for the at least one second STA that satisfies the SINR criterion, wherein the AP device transmits the DL data to each of the at least one second STA according to the DL transmission rate associated with each of the at least one second STA.

27. The AP device of claim 26, wherein the first communication comprises a DL multi-user (MU) physical-layer protocol data unit (PPDU) including at least the first frame and the second frame.

28. The AP device of claim 15, wherein the DL data is transmitted to the at least one second STA on a first wireless channel, and the UL data is received from the selected at least one first STA on a second wireless channel different than the first wireless channel.

* * * * *